US010828715B2

(12) United States Patent
Rajagopalan

(10) Patent No.: US 10,828,715 B2
(45) Date of Patent: Nov. 10, 2020

(54) SYSTEM FOR WELDING

(71) Applicant: CRC-EVANS PIPELINE INTERNATIONAL INC., Houston, TX (US)

(72) Inventor: Shankar Rajagopalan, Cypress, TX (US)

(73) Assignee: CRC-EVANS PIPELINE INTERNATIONAL, INC., Houston, TX (US)

( * ) Notice: Subject to any disclaimer, the term of this patent is extended or adjusted under 35 U.S.C. 154(b) by 636 days.

(21) Appl. No.: 15/506,818

(22) PCT Filed: Aug. 28, 2015

(86) PCT No.: PCT/US2015/047603
§ 371 (c)(1),
(2) Date: Feb. 27, 2017

(87) PCT Pub. No.: WO2016/033568
PCT Pub. Date: Mar. 3, 2016

(65) Prior Publication Data
US 2017/0274467 A1 Sep. 28, 2017

Related U.S. Application Data

(60) Provisional application No. 62/043,757, filed on Aug. 29, 2014.

(51) Int. Cl.
*B23K 9/10* (2006.01)
*B23K 9/095* (2006.01)
*B23K 101/10* (2006.01)

(52) U.S. Cl.
CPC .......... *B23K 9/1087* (2013.01); *B23K 9/0953* (2013.01); *B23K 9/0956* (2013.01); *B23K 2101/10* (2018.08)

(58) Field of Classification Search
CPC .. B23K 9/1087; B23K 9/0953; B23K 9/0956; B23K 2101/10; B23K 9/1006
(Continued)

(56) References Cited

U.S. PATENT DOCUMENTS 1,693,064 A 11/1928 Tipton
1,846,470 A 2/1932 Burnish
(Continued)

FOREIGN PATENT DOCUMENTS

CA 1051979 4/1979
CA 1239448 7/1988
(Continued)

OTHER PUBLICATIONS

Notice of Allowance issued in corresponding U.S. Appl. No. 15/441,804, dated Jul. 3, 2019.
(Continued)

*Primary Examiner* — Phuong T Nguyen
(74) *Attorney, Agent, or Firm* — Pillsbury Winthrop Shaw Pittman LLP

(57) ABSTRACT

A welding system includes a welding station having a weld station computer and a weld system in communication with the weld station computer. The weld system includes a supply of weld material, a welding device, and a weld supply motor assembly that moves the weld material to the welder device. The system further includes a weighting device operatively connected with the weld station computer to measure a weight of the supply of weld material and to communicate the weight of the supply of weld material to the weld station computer; and a sensor operatively connected with the weld supply motor assembly and the weld station computer so as to communicate the speed of the weld supply motor assembly to the weld station computer. The weld station computer is operatively connected to the weld (Continued)

supply motor assembly to control the speed of the motor assembly based on the weight data.

10 Claims, 22 Drawing Sheets

(58) Field of Classification Search
USPC .............. 219/124.34, 125.11, 125.12, 130.1, 219/130.51, 132, 137 R, 137.71, 37.72
See application file for complete search history.

(56) References Cited

U.S. PATENT DOCUMENTS

| | | | |
|---|---|---|---|
| 2,037,962 A | 4/1936 | Brown |
| 2,259,367 A | 10/1941 | Ely et al. |
| 2,308,340 A | 1/1943 | Newlon |
| 2,400,737 A | 5/1946 | Brown, Jr. |
| 2,780,194 A | 2/1957 | Croswell |
| 2,816,208 A | 12/1957 | McDowall |
| 2,833,910 A | 5/1958 | Stanton et al. |
| 2,887,972 A | 5/1959 | Handley |
| 2,936,517 A | 5/1960 | Brown, Jr. et al. |
| 3,008,037 A | 11/1961 | Harmes |
| 3,009,048 A | 11/1961 | Stanley |
| 3,009,049 A | 11/1961 | Stanley |
| 3,016,856 A | 1/1962 | Cummings |
| 3,044,431 A | 7/1962 | Cummings |
| 3,110,277 A | 11/1963 | Dixon et al. |
| 3,164,712 A | 1/1965 | Paton et al. |
| 3,194,466 A | 7/1965 | Davis |
| 3,209,115 A | 9/1965 | Van Iperen |
| 3,261,529 A | 7/1966 | Pagan |
| 3,369,725 A | 2/1968 | Thomas |
| 3,379,853 A | 4/1968 | Domizi |
| 3,424,887 A | 1/1969 | Fehlman |
| 3,461,264 A | 8/1969 | Nelson et al. |
| 3,508,433 A | 4/1970 | Bustin |
| 3,534,199 A | 10/1970 | Downey et al. |
| 3,539,915 A | 11/1970 | Walters et al. |
| 3,551,636 A | 12/1970 | Nelson |
| 3,561,320 A | 2/1971 | Nelson |
| 3,581,049 A | 5/1971 | Creith |
| 3,611,541 A | 10/1971 | Garrett |
| 3,612,808 A | 10/1971 | Nelson et al. |
| 3,633,813 A | 1/1972 | Looney |
| 3,645,105 A | 2/1972 | Nolan, Jr. |
| 3,646,309 A | 2/1972 | Smith, Jr. et al. |
| 3,668,359 A | 6/1972 | Emmerson |
| 3,681,560 A | 8/1972 | Stanley |
| 3,727,025 A | 4/1973 | Dibenedetto |
| 3,741,457 A | 6/1973 | Gwin |
| 3,748,426 A | 7/1973 | Stanley |
| 3,750,451 A | 8/1973 | Nolan, Jr. |
| 3,761,005 A | 9/1973 | Baxter et al. |
| 3,764,056 A | 10/1973 | Edwards et al. |
| 3,765,665 A | 10/1973 | Work |
| 3,806,694 A | 4/1974 | Randolph |
| 3,841,547 A | 10/1974 | Bartley |
| 3,857,162 A | 12/1974 | Hoffmann |
| 3,895,209 A | 7/1975 | Moriki et al. |
| 3,904,845 A | 9/1975 | Minkiewicz |
| 3,920,171 A | 11/1975 | Clavin |
| 3,922,517 A | 11/1975 | Nelson |
| 3,961,741 A | 6/1976 | Klein |
| 3,974,356 A | 8/1976 | Nelson et al. |
| 3,979,041 A | 9/1976 | Kaneyama et al. |
| 3,992,818 A | 11/1976 | Clausen |
| 4,019,016 A | 4/1977 | Friedman et al. |
| 4,039,115 A | 8/1977 | Randolph et al. |
| 4,084,739 A | 4/1978 | Koltz |
| 4,092,950 A | 6/1978 | Hart |
| 4,101,067 A | 7/1978 | Sloan et al. |
| 4,144,992 A | 3/1979 | Omae et al. |
| 4,145,593 A | 3/1979 | Merrick |
| 4,145,594 A | 3/1979 | Koshiga |
| 4,152,568 A | 5/1979 | Yamaguchi et al. |
| 4,213,345 A | 7/1980 | Dufour |
| 4,215,809 A | 8/1980 | Davis |
| 4,218,604 A | 8/1980 | Masaoka et al. |
| 4,223,197 A | 9/1980 | Imai et al. |
| 4,253,599 A | 3/1981 | Slavens |
| 4,273,985 A | 6/1981 | Paton et al. |
| 4,283,617 A | 8/1981 | Merrick et al. |
| 4,285,460 A | 8/1981 | Clavin |
| 4,306,134 A | 12/1981 | Slavens |
| 4,310,737 A | 1/1982 | Paton |
| 4,340,163 A | 7/1982 | Romashov |
| 4,360,961 A | 11/1982 | Chlebowski |
| 4,380,696 A | 4/1983 | Masaki |
| 4,436,974 A | 3/1984 | Lebedev |
| 4,443,677 A | 4/1984 | DeSaw |
| 4,483,106 A | 11/1984 | Wachs et al. |
| 4,491,718 A | 1/1985 | Cook et al. |
| 4,500,764 A | 2/1985 | Girodi |
| 4,504,047 A | 3/1985 | Jantzen |
| 4,531,192 A | 7/1985 | Cook |
| 4,565,003 A | 1/1986 | McLeod |
| 4,573,666 A | 3/1986 | Nomura et al. |
| 4,575,611 A | 3/1986 | Bertossa |
| 4,582,241 A | 4/1986 | Johnson |
| 4,638,984 A | 1/1987 | Puisais et al. |
| 4,666,138 A | 5/1987 | Dearman |
| 4,667,936 A | 5/1987 | Hale, Jr. |
| 4,712,720 A | 12/1987 | Tesch |
| 4,715,809 A | 12/1987 | Langhoff et al. |
| 4,750,662 A | 6/1988 | Kagimoto |
| 4,831,233 A | 5/1989 | Gordon |
| 4,838,477 A | 6/1989 | Roach et al. |
| 4,839,495 A | 6/1989 | Kitera et al. |
| 4,851,639 A | 7/1989 | Sugitani |
| 4,927,091 A | 5/1990 | Weiss et al. |
| 4,959,523 A | 9/1990 | Fihey et al. |
| 5,097,110 A | 3/1992 | Hamada et al. |
| 5,107,387 A | 4/1992 | Orton |
| 5,136,452 A | 8/1992 | Orton |
| 5,148,000 A | 9/1992 | Tews |
| 5,165,160 A | 11/1992 | Poncelet |
| 5,227,601 A | 7/1993 | Black |
| 5,235,152 A | 8/1993 | Jankus |
| 5,288,005 A | 2/1994 | Beakley |
| 5,288,963 A | 2/1994 | Jusionis |
| 5,343,016 A | 8/1994 | Davis et al. |
| 5,435,478 A | 7/1995 | Wood et al. |
| 5,435,479 A | 7/1995 | Puzey et al. |
| 5,474,225 A | 12/1995 | Geier et al. |
| 5,481,085 A | 1/1996 | Kovacevic et al. |
| 5,593,605 A | 1/1997 | Jones |
| 5,601,225 A | 2/1997 | Wood et al. |
| 5,667,706 A | 9/1997 | Pirl |
| 5,669,547 A | 9/1997 | Spring |
| 5,685,996 A | 11/1997 | Ricci |
| 5,685,999 A | 11/1997 | Wiedemann et al. |
| 5,706,863 A | 1/1998 | Matherne et al. |
| 5,728,992 A | 3/1998 | Swidwa |
| 5,738,725 A | 4/1998 | Bernstein, Jr. |
| 5,796,069 A | 8/1998 | Jones et al. |
| 5,816,479 A | 10/1998 | Matherne et al. |
| 5,837,966 A | 11/1998 | Timmons, Jr. |
| 5,865,430 A | 2/1999 | Conover et al. |
| 5,925,268 A | 7/1999 | Britnell |
| 6,022,506 A | 2/2000 | Simmons |
| 6,027,007 A | 2/2000 | Bosio |
| 6,044,769 A | 4/2000 | Oka et al. |
| 6,051,803 A | 4/2000 | Hale, Jr. |
| 6,075,220 A | 6/2000 | Essien et al. |
| 6,084,203 A | 7/2000 | Bonigen |
| 6,098,866 A | 8/2000 | Tsuchiya et al. |
| 6,109,503 A | 8/2000 | Parker |
| 6,188,041 B1 | 2/2001 | Kim et al. |
| 6,220,498 B1 | 4/2001 | Gordon et al. |
| 6,230,072 B1 | 5/2001 | Powell et al. |
| 6,290,786 B1 | 9/2001 | Brown et al. |
| 6,325,277 B1 | 12/2001 | Collie |
| 6,333,699 B1 | 12/2001 | Zierolf |

(56) References Cited

U.S. PATENT DOCUMENTS

| | | |
|---|---|---|
| 6,417,488 B1 | 7/2002 | Takeuchi et al. |
| 6,515,251 B1 | 2/2003 | Wind |
| 6,583,386 B1 | 6/2003 | Ivkovich |
| 6,596,961 B2 | 7/2003 | Ehlers et al. |
| 6,605,800 B1 | 8/2003 | Schick et al. |
| 6,752,175 B1 | 6/2004 | Willschuetz et al. |
| 6,759,968 B2 | 7/2004 | Zierolf |
| 6,840,433 B2 | 1/2005 | Vermaat |
| 6,850,161 B1 | 2/2005 | Elliott et al. |
| 6,909,066 B2 | 6/2005 | Zheng et al. |
| 6,917,176 B2 | 7/2005 | Schempf et al. |
| 6,924,452 B2 | 8/2005 | Kimura |
| 6,926,069 B1 | 8/2005 | Roffelsen |
| 7,014,100 B2 | 3/2006 | Zierolf |
| 7,032,809 B1 | 4/2006 | Hopkins |
| 7,091,447 B2 | 8/2006 | Kim et al. |
| 7,114,881 B2 | 10/2006 | Belloni et al. |
| 7,159,654 B2 | 1/2007 | Ellison et al. |
| 7,182,025 B2 | 2/2007 | Ghorbel et al. |
| 7,205,503 B2 | 4/2007 | Reynolds et al. |
| 7,277,014 B1 | 10/2007 | Waterhouse et al. |
| 7,282,663 B2 | 10/2007 | Alford et al. |
| 7,474,221 B2 | 1/2009 | Den Boer et al. |
| 7,484,625 B2 | 2/2009 | Scott et al. |
| 7,510,218 B2 | 3/2009 | Holdren |
| 7,540,401 B2 | 6/2009 | Vermaat |
| 7,577,285 B2 | 8/2009 | Schwarz et al. |
| 7,657,082 B2 | 2/2010 | Kubo et al. |
| 7,661,574 B1 | 2/2010 | McGushion |
| 7,675,422 B2 | 3/2010 | Stevens et al. |
| 7,677,439 B2 | 3/2010 | Zierolf |
| 7,688,210 B2 | 3/2010 | Staff |
| 7,713,000 B2 | 5/2010 | Verkuijl et al. |
| 7,774,917 B2 | 8/2010 | Anderson et al. |
| 7,780,065 B2 | 8/2010 | Vermaat |
| 7,798,023 B1 | 9/2010 | Hoyt et al. |
| 7,802,714 B1 | 9/2010 | Kuchuk-Yatsenko et al. |
| 7,915,561 B2 | 3/2011 | Kossowan |
| 7,966,860 B2 | 6/2011 | Dijkstra |
| 8,016,037 B2 | 9/2011 | Bloom et al. |
| 8,091,775 B2 | 1/2012 | Zierolf |
| 8,115,138 B2 | 2/2012 | Jacovetty et al. |
| 8,205,503 B2 | 6/2012 | Cox |
| 8,313,016 B2 | 11/2012 | Dagenais |
| 8,328,071 B2 | 12/2012 | Lavalley et al. |
| 8,350,184 B2 | 1/2013 | Behr et al. |
| 8,353,443 B2 | 1/2013 | Sugiyama et al. |
| 8,378,841 B2 | 2/2013 | Stevens et al. |
| 8,389,902 B2 | 3/2013 | McKinley |
| 8,534,530 B2 | 9/2013 | Biggs |
| 8,590,769 B2 | 11/2013 | Lavalley et al. |
| 8,658,941 B2* | 2/2014 | Albrecht ............ B23K 9/0953 219/137 R |
| 8,689,836 B2 | 4/2014 | Hudson |
| 8,695,198 B2 | 4/2014 | Dagenais |
| 8,714,433 B1 | 5/2014 | Snead et al. |
| 8,777,201 B2 | 7/2014 | Dagenais |
| 8,777,482 B2 | 7/2014 | Pfitzner et al. |
| 8,782,863 B2 | 7/2014 | Pfeiffer |
| 8,800,575 B2 | 8/2014 | Angel |
| 8,864,012 B2 | 10/2014 | Bonelli |
| 8,955,733 B2 | 2/2015 | Vanderpol et al. |
| 8,973,244 B2 | 3/2015 | Lavalley et al. |
| 9,030,324 B2 | 5/2015 | Christiansen et al. |
| 9,038,670 B2 | 5/2015 | Vinoy |
| 9,183,222 B2 | 11/2015 | Gale et al. |
| 9,304,204 B2 | 4/2016 | Krauhausen et al. |
| 9,821,415 B2 | 11/2017 | Rajagopalan |
| 2001/0015349 A1 | 8/2001 | Belloni |
| 2001/0017292 A1 | 8/2001 | Belloni |
| 2003/0188589 A1 | 10/2003 | Harthorn et al. |
| 2004/0009042 A1 | 1/2004 | Belloni et al. |
| 2004/0032597 A1 | 2/2004 | Esmiller |
| 2004/0099713 A1 | 5/2004 | Laing |
| 2005/0103766 A1 | 5/2005 | Iizuka et al. |
| 2005/0247686 A1 | 11/2005 | Child |
| 2006/0070987 A1 | 4/2006 | Daniel |
| 2007/0000972 A1 | 1/2007 | Koga |
| 2007/0023185 A1 | 2/2007 | Hall et al. |
| 2007/0023479 A1 | 2/2007 | Koppert |
| 2007/0145129 A1 | 6/2007 | Perkin et al. |
| 2007/0210047 A1 | 9/2007 | Child |
| 2007/0256288 A1 | 11/2007 | Vermaat |
| 2009/0019783 A1 | 1/2009 | Amano |
| 2009/0078742 A1 | 3/2009 | Pasquali |
| 2009/0212024 A1 | 8/2009 | Muller et al. |
| 2009/0230120 A1 | 9/2009 | Yang |
| 2009/0307891 A1 | 12/2009 | Offer |
| 2010/0051672 A1 | 3/2010 | Nunnery |
| 2010/0126968 A1 | 5/2010 | Page |
| 2010/0230953 A1 | 9/2010 | Baylot et al. |
| 2011/0107571 A1 | 5/2011 | Kerdiles |
| 2011/0192569 A1 | 8/2011 | McKinley |
| 2011/0198316 A1 | 8/2011 | Legori et al. |
| 2011/0297316 A1 | 12/2011 | Jackson et al. |
| 2012/0061452 A1 | 3/2012 | Wolstenholme |
| 2012/0074631 A1 | 3/2012 | Dagenais |
| 2012/0126008 A1 | 5/2012 | Binmore |
| 2012/0174372 A1 | 7/2012 | Dagenais |
| 2012/0187096 A1 | 7/2012 | Schmid et al. |
| 2012/0201348 A1 | 8/2012 | Knight et al. |
| 2012/0213937 A1 | 8/2012 | Lavalley et al. |
| 2012/0215354 A1 | 8/2012 | Krasny et al. |
| 2012/0257042 A1 | 10/2012 | McKaigue et al. |
| 2012/0297652 A1 | 11/2012 | Halvorsen |
| 2013/0008548 A1 | 1/2013 | Bowers |
| 2013/0026148 A1 | 1/2013 | Aoyama et al. |
| 2013/0048619 A1 | 2/2013 | Doyle et al. |
| 2013/0075380 A1* | 3/2013 | Albrech ............ B23K 9/1006 219/137 R |
| 2013/0112677 A1 | 5/2013 | Christopher et al. |
| 2013/0119037 A1 | 5/2013 | Daniel |
| 2013/0126497 A1 | 5/2013 | Miller |
| 2013/0126503 A1 | 5/2013 | McKinley |
| 2013/0200057 A1 | 8/2013 | Miller |
| 2013/0306710 A1 | 11/2013 | Kim |
| 2014/0001166 A1 | 1/2014 | Peters et al. |
| 2014/0006227 A1 | 1/2014 | Griggs et al. |
| 2014/0042207 A1 | 2/2014 | Lavalley et al. |
| 2014/0091129 A1 | 4/2014 | Peters et al. |
| 2014/0107947 A1 | 4/2014 | Papadimitriou et al. |
| 2014/0131333 A1 | 5/2014 | Zhang |
| 2014/0137389 A1 | 5/2014 | Dagenais |
| 2014/0191904 A1 | 7/2014 | Illerhaus |
| 2014/0217154 A1 | 8/2014 | Obaditch |
| 2014/0266009 A1 | 9/2014 | Comello et al. |
| 2014/0294285 A1 | 10/2014 | Duckworth et al. |
| 2014/0346163 A1 | 11/2014 | Rajagopalan et al. |
| 2015/0034629 A1 | 2/2015 | Sherrill et al. |
| 2015/0083785 A1 | 3/2015 | Park |
| 2015/0108223 A1 | 4/2015 | Weitzhandler |
| 2015/0114507 A1 | 4/2015 | Warren |
| 2015/0129579 A1 | 5/2015 | Traver |
| 2015/0146216 A1 | 5/2015 | Krauhausen et al. |
| 2015/0226872 A1 | 8/2015 | Doany et al. |
| 2015/0248569 A1 | 9/2015 | Rushing |
| 2015/0273636 A1 | 10/2015 | Rajagopalan et al. |
| 2015/0298238 A1 | 10/2015 | Van Rensburg |
| 2015/0330551 A1 | 11/2015 | Van Nie et al. |
| 2015/0352653 A1 | 12/2015 | Albrecht |
| 2015/0360332 A1 | 12/2015 | Singh et al. |
| 2016/0032707 A1 | 2/2016 | Bowman |
| 2016/0032713 A1 | 2/2016 | Hallundbæk et al. |
| 2016/0114418 A1 | 4/2016 | Jones |
| 2016/0221107 A1 | 8/2016 | Kadlec |
| 2016/0256961 A1 | 9/2016 | Clemmons |
| 2017/0144256 A1 | 5/2017 | Tao |
| 2017/0182605 A1 | 6/2017 | Rajagopalan et al. |
| 2018/0001422 A1 | 1/2018 | Rajagopalan et al. |
| 2018/0029154 A1 | 2/2018 | Rajagopalan et al. |
| 2018/0031152 A1 | 2/2018 | Rajagopalan et al. |
| 2018/0117718 A1 | 5/2018 | Rajagopalan et al. |

(56) References Cited

U.S. PATENT DOCUMENTS

| | | |
|---|---|---|
| 2018/0185951 A1 | 7/2018 | Lanz |
| 2019/0176260 A1 | 6/2019 | Kadlec |

FOREIGN PATENT DOCUMENTS

| | | |
|---|---|---|
| CA | 2141524 | 8/1995 |
| CA | 2721167 | 10/2009 |
| CA | 2838608 | 12/2012 |
| CN | 1069213 | 2/1993 |
| CN | 2825214 | 10/2006 |
| CN | 101332550 | 12/2008 |
| CN | 201273837 | 7/2009 |
| CN | 202188887 | 4/2012 |
| CN | 103495795 | 1/2014 |
| CN | 103826788 | 5/2014 |
| CN | 104010756 | 8/2014 |
| CN | 104209626 | 12/2014 |
| CN | 105675097 | 6/2016 |
| DE | 20 2006 004122 | 5/2006 |
| EP | 0 193 812 | 9/1986 |
| EP | 0300458 | 1/1989 |
| EP | 1985405 | 10/2008 |
| EP | 2 340 908 | 7/2011 |
| EP | 3106951 | 12/2016 |
| GB | 1 261 814 | 1/1972 |
| GB | 1283922 | 8/1972 |
| GB | 1 386 926 | 3/1975 |
| GB | 2 214 118 | 8/1989 |
| JP | 53113736 | 10/1978 |
| JP | 55027422 | 2/1980 |
| JP | 55040040 | 3/1980 |
| JP | 55156695 | 12/1980 |
| JP | 56148475 | 11/1981 |
| JP | 58145394 | 8/1983 |
| JP | 58-212890 | 12/1983 |
| JP | 59-030495 | 2/1984 |
| JP | 59-92194 | 5/1984 |
| JP | 59110476 | 6/1984 |
| JP | 60-72673 | 4/1985 |
| JP | 60-82284 | 5/1985 |
| JP | S61159275 | 7/1986 |
| JP | 01224167 | 9/1989 |
| JP | 02104474 | 4/1990 |
| JP | 2-127976 | 5/1990 |
| JP | 3-13270 | 1/1991 |
| JP | 3-90282 | 4/1991 |
| JP | 3-90283 | 4/1991 |
| JP | 05000374 | 1/1993 |
| JP | 05069131 | 3/1993 |
| JP | 7-116842 | 5/1995 |
| JP | 7-155949 | 6/1995 |
| JP | 10-244367 | 9/1998 |
| JP | 11-10486 | 1/1999 |
| JP | 2001-170784 | 6/2001 |
| JP | 2007-205941 | 8/2007 |
| JP | 2008212994 | 9/2008 |
| JP | 2011177016 | 9/2011 |
| JP | 2012-218031 | 11/2012 |
| KR | 20050040883 | 5/2005 |
| KR | 10-0598523 | 7/2006 |
| KR | 10-2012-0044131 | 5/2012 |
| KR | 10-1143532 | 5/2012 |
| RU | 2218251 | 12/2003 |
| SU | 1199544 | 12/1985 |
| SU | 1741999 | 6/1992 |
| WO | 8705840 | 10/1987 |
| WO | 90/06205 | 6/1990 |
| WO | 9705983 | 2/1997 |
| WO | 00/41843 | 7/2000 |
| WO | 0041488 | 7/2000 |
| WO | 0041845 | 7/2000 |
| WO | 01/70446 | 9/2001 |
| WO | 02/00385 | 1/2002 |
| WO | 0249799 | 6/2002 |
| WO | 2007/097589 | 8/2007 |
| WO | 2009/059776 | 5/2009 |
| WO | 2010/002269 | 1/2010 |
| WO | 2010/046390 | 4/2010 |
| WO | 2011/012998 | 2/2011 |
| WO | 2013/171589 | 11/2013 |
| WO | 2013172244 | 11/2013 |
| WO | 2015/148765 | 10/2015 |
| WO | 2016/153562 | 9/2016 |

OTHER PUBLICATIONS

Non-Final Office Action issued in corresponding U.S. Appl. No. 15/714,117, dated Jun. 19, 2019.
Official Action issued in corresponding Mexican Patent Application No. MX/a/2017/002690, dated May 7, 2019.
Decision to Grant issued in corresponding Russian Patent Application No. 2015154971, dated Apr. 22, 2019.
Office Action issued for corresponding Russian Patent Application No. 2017134991/02(061281), dated May 29, 2019.
Technical Examination Report issued for corresponding Brazilian Patent Application No. BR112015029273-9, dated Jun. 20, 2019.
Notice of Acceptance issued for corresponding Australian Patent Applioation No. 2015236037, dated Jul. 19, 2019.
International Preliminary Report on Patentability issued for corresponding International Application No. PCT/US2017/042612, dated Jul. 30, 2019.
Examination Report issued for corresponding European Patent Application No. 15836899.3, dated Aug. 8, 2019.
"Explorer II—Wireless Self-powered Visual and NDE Robotic Inspection System for Live Gas Pipelines", National Energy Technology Laboratory, DE-FC26-04NT42264, downloaded from URL: http://www.netl.doe.gov/research/oil-and-gas/project-summaries/completed-td/de-fc26-04nt42264 (4 pages).
"Final Report: Explorer-II: Wireless Self-powered Visual and NDE Robotic Inspection System for Live Gas Distribution Mains", Oil & Natrural Gas Technology,DE-FC26-04NT-42264, downloaded from URL: https://www.netl.doe.gov/File%20Library/Research/Oil-Gas/NT42264_FinalReport.pdf (120 pages).
Non-Final Office Action dated Aug. 11, 2016 in corresponding U.S. Appl. No. 14/272,914.
International Search Report dated Jul. 23, 2015 in corresponding International Patent Application No. PCT/US2015/022665.
Final Office Action issued in corresponding U.S. Appl. No. 14/272,914 dated Jan. 26, 2017.
International Search Report and the Written Opinion of the International Searching Authority dated Mar. 29, 2016 in corresponding International Application No. PCT/US2015/062558 (46 pages).
Non-Final Office Action issued in corresponding U.S. Appl. No. 14/228,708, dated Mar. 1, 2017.
Extended European Search Report, including Search Opinion, issued in corresponding European Patent Application No. 14800710.7, dated Jan. 23, 2017.
Non-Final Office Action dated Jun. 20, 2016 in corresponding U.S. Appl. No. 14/228,708 (12 pages).
International Search Report and Written Opinion issued for corresponding International Patent Application No. PCT/US2015/022665, dated Jul. 23, 2015 (11 pages).
International Preliminary Report on Patentability issued for corresponding International Patent Application No. PCT/US2015/022665, dated Oct. 13, 2016 (10 pages).
Examination Report issued for corresponding Australian Patent Application No. 2014268528, dated Apr. 28, 2017.
Examination Report issued for corresponding Chinese Patent Application No. 201480029722.8, dated May 15, 2017.
Examination Report issued for corresponding Chinese Patent Application No. 201480029722.8, dated Jul. 18, 2016.
Search Report and Written Opinion issued for corresponding International Application No. PCT/US2014/039148, dated Oct. 1, 2014.
International Preliminary Report on Patentability issued for corresponding International Application No. PCT/US2014/039148, dated Dec. 3, 2015.

(56) References Cited

OTHER PUBLICATIONS

International Preliminary Report on Patentability issued in corresponding International Patent Application No. PCT/US2015/047603, dated Mar. 9, 2017.
Examination Report issued for corresponding European Patent Application No. 14800710.7, dated Feb. 7, 2019.
Office Action issued in corresponding Chinese Patent Application No. 201580016820.2, dated Apr. 4, 2018.
Office Action issued in corresponding Chinese Patent Application No. 201580045390.7, dated Apr. 10, 2018.
Office Action and Search Report issued in corresponding Russian Patent Application No. 2015154971, dated Apr. 27, 2018.
Examination Report issued for corresponding Chinese Patent Application No. 201480029722.8, dated Apr. 4, 2018.
European Search Report issued for corresponding European Patent Application No. 15836899.3, dated May 24, 2018.
International Search Report and Written Opinion of International Patent Application No. PCT/US2015/047603, dated Jan. 5, 2016.
Search Report and Written Opinion issued for corresponding International Application No. PCT/US2017/042612, dated Nov. 13, 2017.
Search Report and Written Opinion issued for corresponding International Application No. PCT/IB2017/055221, dated Nov. 30, 2017.
Second Office Action issued in corresponding Chinese Patent Application No. 201580080511.1, dated Aug. 26, 2019.
Decision to Grant issued in corresponding Russian Patent Application No. 2017134991, dated Aug. 29, 2019.
Third Office Action issued in corresponding Chinese Patent Application No. 201580045390.7, dated Sep. 20, 2019.
Preliminary Office Action Report issued in corresponding Brazilian Patent Application No. BR112017020431-2, dated Oct. 1, 2019.
Notice of Allowance issued in corresponding U.S. Appl. No. 15/714,117, dated Oct. 28, 2019.
Non-Final Office Action issued in corresponding U.S. Appl. No. 14/272,914, dated Aug. 24, 2017.
Notice of Allowance issued in corresponding U.S. Appl. No. 14/228,708, dated Jul. 17, 2017.
Office Action issued in corresponding Chinese Patent Application No. 201580016820.2, dated Jul. 19, 2017.
International Preliminary Report on Patentability issued for corresponding International Patent Application No. PCT/US2015/062558, dated Oct. 5, 2017.
Non-Final Office Action issued in corresponding U.S. Appl. No. 15/441,804, dated Jul. 30, 2018.
Non-Final Office Action issued in corresponding U.S. Appl. No. 15/714,117, dated Sep. 17, 2018.
Extended Search Report issued for corresponding European Patent Application No. 15886707.7, dated Nov. 13, 2018.
Office Action issued in corresponding Russian Patent Application No. 2016142270/06(067667), dated Nov. 15, 2018.
Office Action issued in corresponding Chinese Patent Application No. 201580080511.1, dated Dec. 3, 2018.
Examination Report issued for corresponding Australian Patent Application No. 2015236037, dated Jan. 4, 2019.
Final Office Action issued in corresponding U.S. Appl. No. 15/441,804, dated Jan. 23, 2019.
Final Office Action issued in corresponding U.S. Appl. No. 14/272,914 dated Jan. 25, 2018.
Notice of Allowance issued in corresponding U.S. Appl. No. 14/272,914, dated Apr. 6, 2018.
Decision to Grant issued in corresponding Russian Patent Application No. 2016142270, dated Feb. 12, 2019.
Official Action issued in corresponding Russian Patent Application No. 2017110223, dated Jan. 31, 2019.
Official Action issued in corresponding Malaysian Patent Application No. PI2015704216, dated Mar. 29, 2019.
Second Office Action issued in corresponding Chinese Patent Application No. 201580045390.7, dated Mar. 4, 2019.
Final Office Action issued in corresponding U.S. Appl. No. 15/714,117, dated Feb. 15, 2019.
Extended European Search Report, including Search Opinion, issued in corresponding European Patent Application No. 15768987.8, dated Oct. 20, 2017.
Non-Final Office Action issued in corresponding U.S. Appl. No. 15/632,061, dated Jan. 27, 2020.
Preliminary Office Action issued in corresponding Brazilian Patent Application No. 112016022229-6, dated Jan. 14, 2020.
Notice of Allowance issued in corresponding U.S. Appl. No. 15/560,954, dated Feb. 13, 2020.
Third Office Action issued in corresponding Chinese Patent Application No. 201580080511.1, dated Mar. 3, 2020.
Office Action issued in corresponding Canadian Patent Application No. 2,942,368, dated Apr. 2, 2020.
"Effects of Welding Point Position, Inclination, Roll Angle and Welding Speed of Submerged Arc of Spiral Steel Pipe on Welding Quality", Liu Baoqiang, National Steel Rolling Production Technology Conference, pp. 919-922, Dec. 31, 2008. (relevance found on pp. 6 and 14 of the Decision of Rejection issued in corresponding Chinese Patent Application No. 201580080511.1, dated Aug. 19, 2020).
"Droplet Transition and Process Characteristics of Double Wire Pulse MAG Welding", Yu Lu et al., Welding Journal, Oct. 31, 2012. (relevance found on pp. 6 and 14 of the Decision of Rejection issued in corresponding Chinese Patent Application No. 201580080511.1, dated Aug. 19, 2020).
"Effects of Laser-MIG Hybrid Welding Process Parameters of Q345 Steel on Weld Joint Formation", Yin Jie, Engineering Machinery, Aug. 31, 2013. (relevance found on pp. 6 and 14 of the Decision of Rejection issued in corresponding Chinese Patent Application No. 201580080511.1, dated Aug. 19, 2020).
"Welding Handbook", Welding Society of China Mechanical Engineering Society, Mechanical Engineering Press, vol. 1 3rd edition, pp. 64-65, Mar. 31, 2008. (relevance found on pp. 6-7 of the Decision of Rejection issued in corresponding Chinese Patent Application No. 201580080511.1 , dated Aug. 19, 2020).
Decision of Rejection issued in corresponding Chinese Patent Application No. 201580080511.1, dated Aug. 19, 2020.
Fourth Office Action issued in corresponding Chinese Patent Application No. 2015800453907.7, dated May 26, 2020.
Preliminary Office Action issued in corresponding Brazilian Patent Application No. BR112017003933-8, dated Jun. 2, 2020.
Examination Report issued in corresponding Australian Patent Application No. 2015387441, dated Jun. 9, 2020.
Final Office Action issued in corresponding U.S. Appl. No. 15/632,061, dated Jun. 12, 2020.
Examination Report issued in corresponding Australian Patent Application No. 2015308646, dated Jul. 21, 2020.

* cited by examiner

CLOUD BASED DATA LOGGING (ULOG)

Get Log

| Weld | Event | Time | Zone | Tilt [deg] | Travel Speed [in] | Lead Volts [V] | Lead Amps [A] | Lead Wire Speed [in] |
|---|---|---|---|---|---|---|---|---|
| 2101-R | 720637100 | 00:51:38:661 | 1T2T | 0 | 19.9 | 11.8 | 250 | 300 |
| 2101-R | 720637103 | 00:51:38:674 | 1T2T | 20 | 19.9 | 22.0 | 250 | 305 |
| 2101-R | 720637106 | 00:51:38:685 | 1T2T | 40 | 19.9 | 22.5 | 255 | 305 |
| 2101-R | 720637109 | 00:51:38:695 | 1T2T | 60 | 19.9 | 22.4 | 245 | 295 |
| 2101-R | 720637112 | 00:51:38:706 | 1M2M | 80 | 18.9 | 20.0 | 230 | 300 |
| 2101-R | 720637115 | 00:51:38:716 | 1M2M | 100 | 18.9 | 20.5 | 235 | 255 |
| 2101-R | 720637118 | 00:51:38:726 | 1M2M | 120 | 18.9 | 20.1 | 232 | 253 |
| 2101-R | 720637121 | 00:51:38:737 | 1M2M | 140 | 18.9 | 20.8 | 238 | 258 |
| 2101-R | 720637124 | 00:51:38:747 | 1B2B | 160 | 17.9 | 18.0 | 210 | 200 |
| 2101-R | 720637127 | 00:51:38:757 | 1B2B | 180 | 17.9 | 18.5 | 215 | 205 |
| 2101-R | 720637130 | 00:51:38:767 | 1B2B | 190 | 17.9 | 17.5 | 205 | 195 |
| 2101-R | 720637133 | 00:51:38:778 | 1B2B | 200 | 17.9 | 18.8 | 217 | 206 |
| 2101-R | 720637100 | 00:51:38:661 | 1T2T | 0 | 19.9 | 11.8 | 250 | 300 |
| 2201-R | 720637103 | 00:51:38:674 | 1T2T | 20 | 19.9 | 20.5 | 250 | 305 |
| 2201-R | 720637106 | 00:51:38:685 | 1T2T | 40 | 19.9 | 22.5 | 255 | 305 |
| 2201-R | 720637109 | 00:51:38:695 | 1T2T | 60 | 19.9 | 22.4 | 245 | 295 |

Next   View By Bugtype   View By Station   View By Joint ID

SECTION A-A

SYSTEM FOR WELDING

CROSS REFERENCE TO RELATED APPLICATIONS

The present patent application is the U.S. National Phase entry of International Patent Application No. PCT/US2015/047603, filed Aug. 28, 2015, which claims the benefit of U.S. Provisional Patent Application No. 62/043,757, filed on Aug. 29, 2014, the contents of both applications are incorporated herein by reference in their entirety.

FIELD OF THE INVENTION

The present patent application pertains to systems and methods for welding.

BACKGROUND OF THE INVENTION

Currently pipe joining technology remains an art relying on the avoidance of error by a worker applying a weld. Current welding technology lacks adequate data management, work control and supervision of activities. As a result of such deficiencies, welding currently suffers from unpredictable quality, undesired variations of methods and techniques, waste of materials, poor economics per weld and safety challenges. The consequences of the currently inadequate welding technologies include, but are not limited to, excessive rework of failed or low quality welds, lack of predictability in weld characteristics, unrepeatable weld procedures, high inspection costs, significant lost time and schedule delays.

SUMMARY OF THE INVENTION

An aspect of an embodiment of the present disclosure is to provide a welding system including a plurality of welding stations, each weld station including a weld station computer and weld system in communication with the weld station computer, each welding station including one or more sensors, the one or more sensors configured to measure weld data including lead wire speed data; a plurality of wireless devices in communication with the one or more of the welding station computers to receive the weld data including the measured lead wire speed data; and a cloud server in communication with the wireless devices, the cloud server being configured to process the weld data including the lead wire speed data, and configured to determine an amount of consumable welding material used by the plurality of welding stations for a given period of time, wherein the cloud server is configured to communicate the amount of consumable welding material used to one or more of the wireless devices.

Another aspect of an embodiment of the present disclosure is to provide a welding system including a welding station, the welding station including a weld station computer and a weld system in communication with the weld station computer, the weld system including a supply of weld material, a welding device, and a weld supply motor assembly that moves the weld material to the welder device; a weighting device operatively connected with the weld station computer and configured to measure a weight of the supply of weld material and to communicate the weight of the supply of weld material to the weld station computer in the form of weight data; and a sensor operatively connected with the weld supply motor assembly and the weld station computer so as to communicate the speed of the weld supply motor assembly to the weld station computer in the form of speed data. The weld station computer is operatively connected to the weld supply motor assembly and is configured to control the speed of the motor assembly based on the weight data.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein are drawn to scale. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The present invention in its several aspects and embodiments solves the problems discussed above and significantly advances the technology of welding, pipe handling, coating, pipeline construction, construction, management and inspection technologies. The present invention can become more fully understood from the detailed description and the accompanying drawings, wherein:

FIG. 14 shows an example GUI for a "Get Log" screen of the application for cloud based universal data logging (uLog) showing weld data parameters including type of weld event, time, zone, weld travel speed, lead wire travel speed, according to an embodiment of the present disclosure;

FIG. 15 shows an example GUI for a summary report screen of the application for cloud based universal data logging (uLog) displaying various welding parameters including weld time, weld station identification number, weld arc voltage, etc., according to an embodiment of the present disclosure;

DETAILED DESCRIPTION OF THE INVENTION

Figure 1:
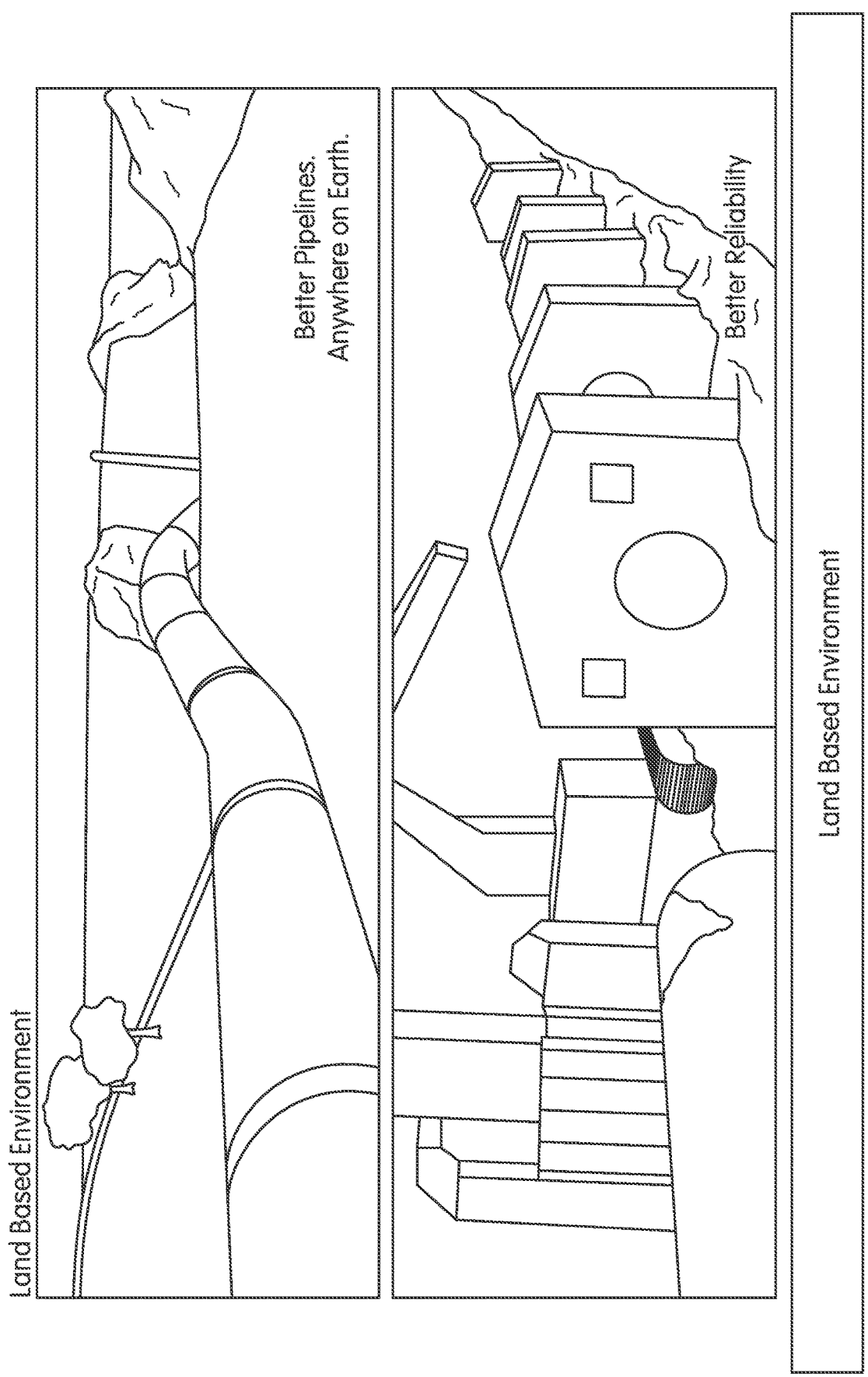
FIG. 1 depict an example of a pipeline.

The universal cloud logging system (herein also as "uLog", or "uLog system", or "uCloud") is a system of software, hardware, equipment and telecommunications networks which seamlessly gather welding data to provide for quality control and management, weld data logging, task and project management, safety and inspection control and management, real time weld activity monitoring and data reporting and visualization. The uLog system can use wired systems and devices and/or wireless systems and devices and/or Bluetooth systems and devices and/or cloud-based systems and devices. The uLog system can use software technology, App technology, mobile device and desktop technology, telecommunications technology and other technologies in products, apparatus, systems, processes and methods achieving high quality welding, inspection, control, management and safety results. The uLog system can be used in onshore, offshore, ship-based, platform-based, structure-based, or other construction conditions. In an embodiment, the uLog can process Bluetooth communications and data can be transmitted to the uLog for processing by Bluetooth or any other wireless means.

In an embodiment uLog has tools which seamlessly gather welding data and/or welding data logs. The uLog system can in its many and varied embodiments use welding data and other pipeline construction and related data to produce one or more of the following: analytic results, field reports, control data, quality control data, automatically generated administrative reports, daily summaries, data archives, welding records, materials use data, quality control records and project management records.

In an embodiment, the uLog can be used to maintain and/or generate procedure qualification records ("PQR") and data relating thereto. The uLog functionality can also be used to record, develop, maintain and manage welding procedure specifications ("WPS").

The uLog can provide for a user to see, record, track, measure, and analyze log data regarding one or more welds and/or welding activities and/or pipeline construction and/or coating activities and/or inspection activities and/or management activities. By use of the uLog and its analytical functionalities a user can achieve improved weld quality and quantify welding process results. In its many and varied embodiments, the uLog can have functionalities to process data in real-time or based upon historical data. This allows a user to make decisions in real time and/or based upon historical data. In an embodiment, the uLog can provide a user real time data regarding any aspect of ongoing welding, coating, inspection, pipe handling, project management, pipeline construction and/or construction activities and achieves real-time quality control of welding and/or welding activities and/or other activities regarding pipeline construction. In another embodiment, the uLog can also provide functionalities regarding construction management, project management, accounting, inventory and materials management, as well as financial controls and auditing of both financials and materials. The uLog can also provide functionalities regarding human resources management and timekeeping, as well as payroll accounting and support.

Without limitation, various embodiments of the present disclosure can be, for example, embodied as a computer system, a method, an App, a cloud-based service, or a computer program product. Accordingly, various embodiments can take the form of an entirely hardware embodiment, an entirely software embodiment (e.g., one or more computer application, such as an "App" (or "App") to be implemented on a mobile device and/or an application to be implanted on a desktop computer), or an embodiment combining software and hardware aspects. Furthermore, embodiments can take the form of a computer program product stored on a computer-readable storage medium having computer-readable instructions (e.g., software) embodied in the storage medium. Various embodiments can take the form of web-implemented computer software. Any suitable computer-readable storage medium can be utilized including, for example, hard disks, compact disks, DVDs, optical storage devices, solid state storage devices, and/or magnetic storage devices.

Various embodiments are described below with reference to schematics, block diagrams, images and flowchart illustrations of methods, apparatuses (e.g., systems) and computer program products. It should be understood that each block of the block diagrams and flowchart illustrations, and combinations of blocks in the block diagrams and flowchart illustrations, respectively, can be implemented by a computer executing computer program instructions. These computer program instructions can be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions can also be stored in a computer-readable memory that can direct a computer or other programmable data processing apparatus to function in a manner such that the instructions stored in the computer-readable memory produce an article of manufacture that can be configured for implementing the function specified in the flowchart block or blocks. The computer program instructions can also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of mechanisms for performing the specified functions, combinations of steps for performing the specified functions, and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and other hardware executing appropriate computer instructions. Implementation can also be by special purpose software and equipment running special purpose software and/or applications. The entire system can be accessible from various computer platforms, including mobile devices.

Numeric values and ranges herein, unless otherwise stated, also are intended to have associated with them a tolerance and to account for variances of design and manufacturing. Thus, a number is intended to include values "about" that number. For example, a value X is also intended to be understood as "about X". Likewise, a range of Y-Z, is also intended to be understood as within a range of from "about Y-about Z". Unless otherwise stated, significant digits disclosed for a number are not intended to make the number an exact limiting value. Variance and tolerance is inherent in mechanical design and the numbers disclosed herein are intended to be construed to allow for such factors (in non-limiting e.g., ±10 percent of a given value). Likewise, the claims are to be broadly construed in their recitations of numbers and ranges.

FIG. 1 contains images of land based pipelines. The uLog can be used in the manufacturing of any pipeline in any construction environment. Construction environments can be on land, off shore, both on land and off shore, under water, sub-sea, on a facility, on a ship, on a barge, on a platform, on a structure, in space, or in any other construction environment. For example, the uLog can be used in the control of welding of pipelines.

Figure 2:
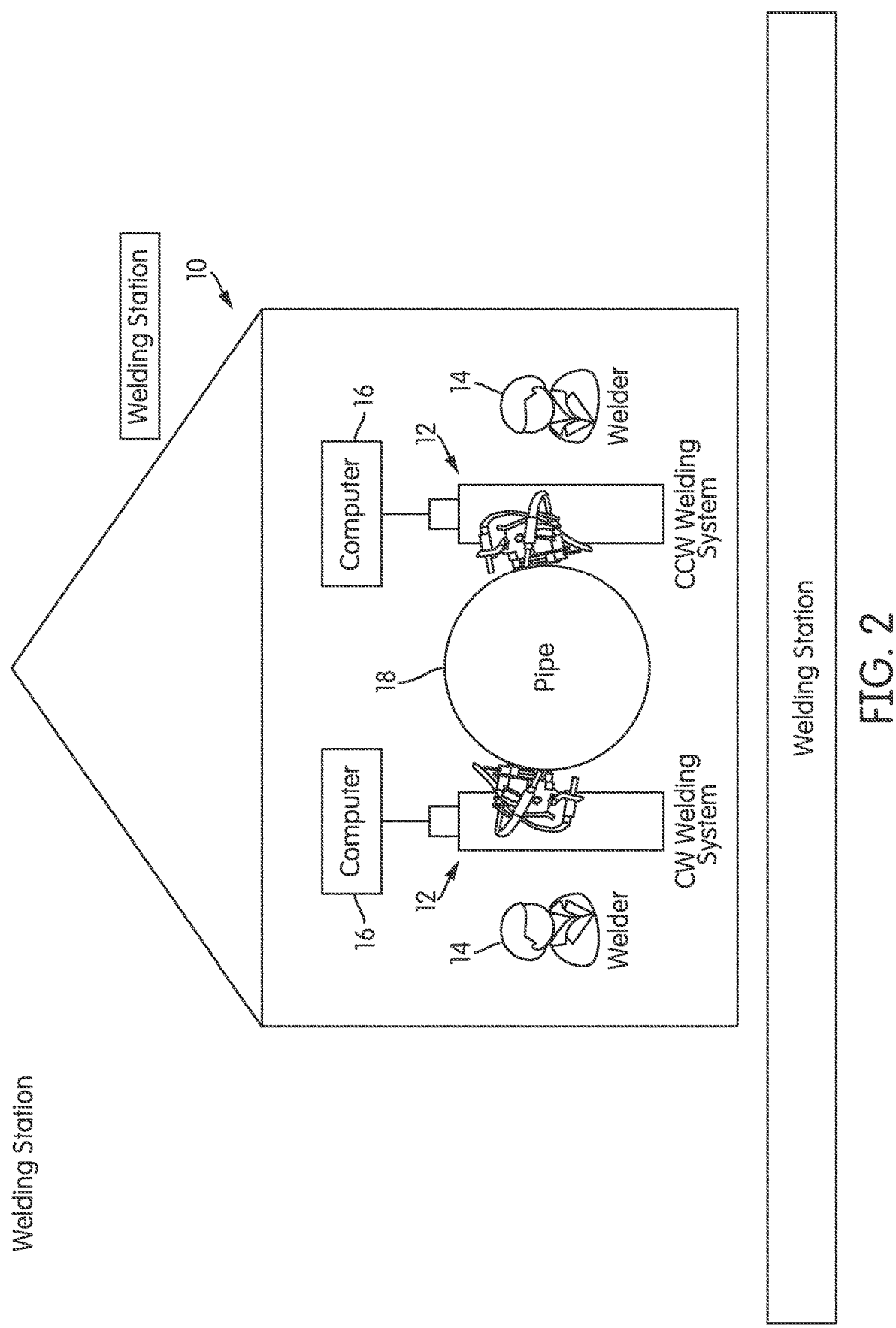
FIG. 2 shows a welding station, according to an embodiment of the present disclosure.

FIG. 2 shows a welding station 10, according to an embodiment of the present disclosure. The uLog can be used in conjunction with the weld station 10. The uLog can process data from the weld station 10. The weld station may include a welding machine or welding system 12, a welder 14 or an automated or robot welding system. In an embodiment, the welding machine or welding system 12 is an orbital welding machine. An example of a welding machine or welding system 12 is described in U.S. Pat. No. 3,974,356 to Nelson et al., issued on Aug. 10, 1976, the entire content of which is incorporated herein by reference. The welding station 10 may be controlled by a computer system 16 to control the welding process and also acquire data about the welding process. The uLog implemented on the computer system 16 can control the welding station 10 including the welding machine 12 and can also process data from a workpiece 18 such as a pipe and/or regarding work or welding applied upon the workpiece (e.g., the pipe) 18.

Figure 3:
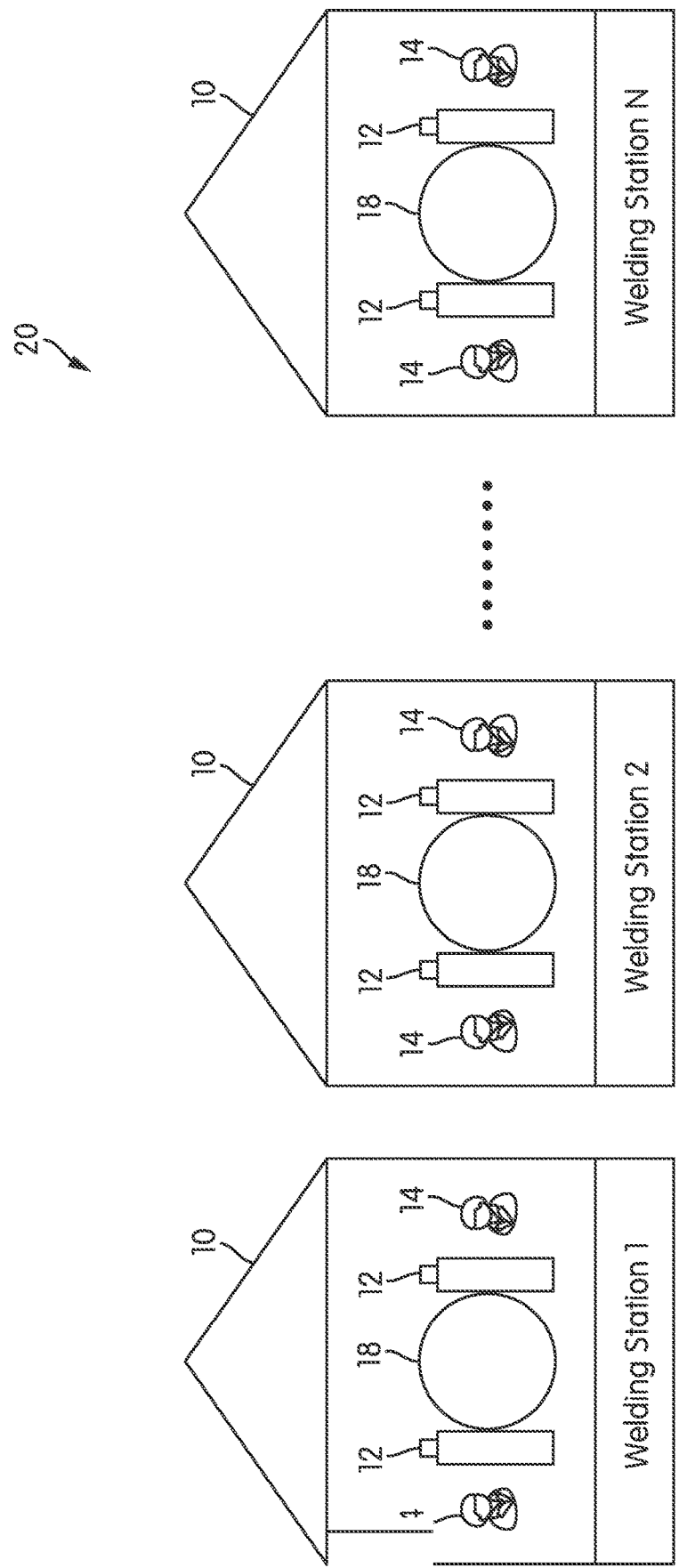
FIG. 3 show a plurality of pipeline welding stations, according to an embodiment of the present disclosure.

FIG. 3 shows a plurality of pipeline welding stations 10 (a pipeline welding spread 20), according to an embodiment of the present disclosure. The uLog can be used on the pipeline welding spread 20. The uLog can process data from one or more welding stations 10 in the pipeline welding spread 20. In an embodiment, the uLog can process data from a number or many welding stations 10. There is no limitation to the locations of the weld stations 10. Pipelines 18 can be very long and the one or more stations can be at any location without limitation. Further, the uLog supports processing data from multiple projects and/or activities and/or tasks and/or people at the same time. The uLog user expertise can be used across projects and well as within projects. The uLog allows a user to work with data from one or a number of projects simultaneously or in series, in real-time or on an historical basis.

Figure 4:
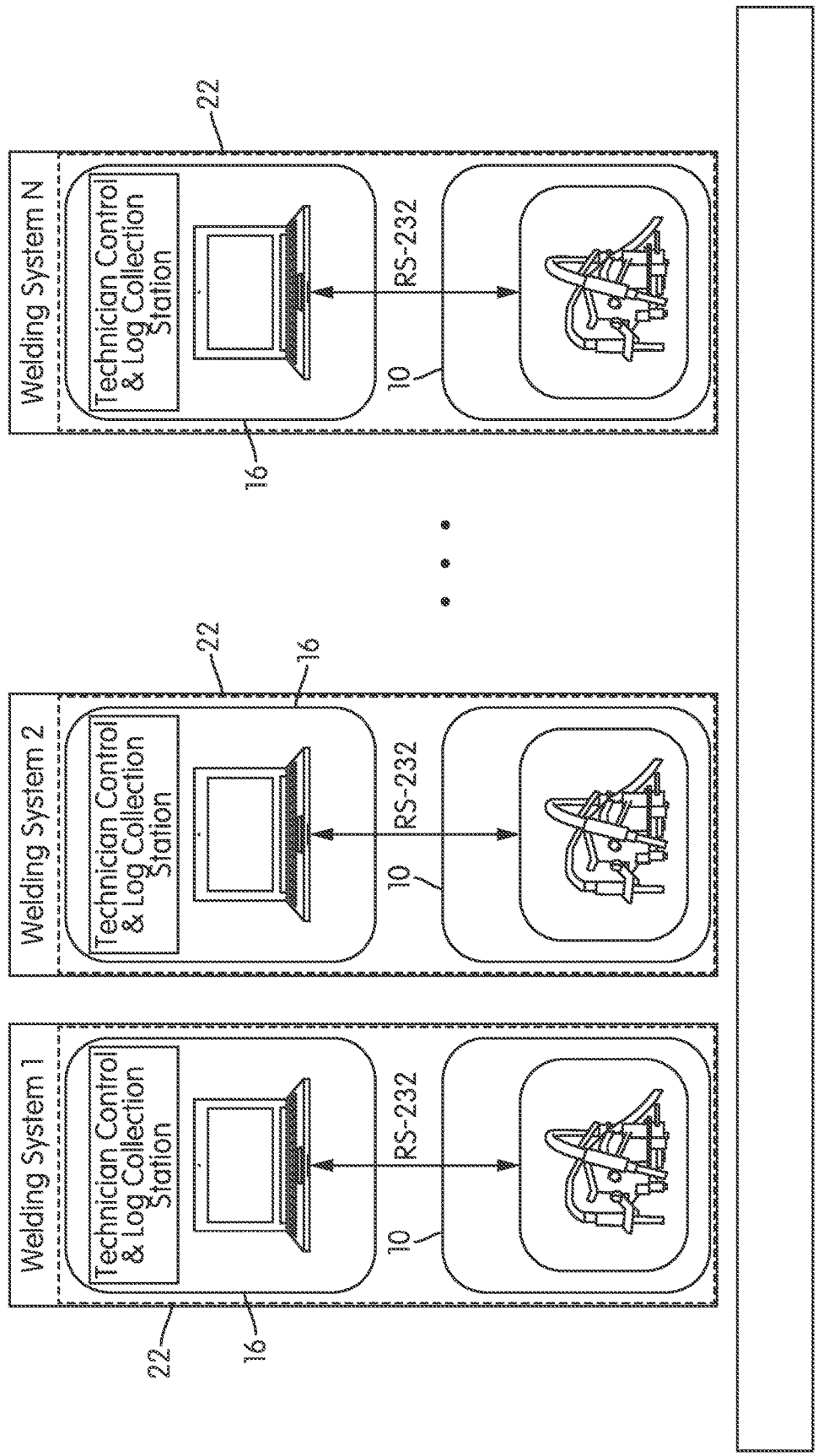
FIG. 4 is a schematic diagram of a system with a plurality of welding stations in communication with a plurality of control and log collection stations, according to an embodiment of the present disclosure.

FIG. 4 is a schematic diagram of a system with a plurality of welding stations 10 in communication with a plurality of control and log collection stations (computer systems) 16, according to an embodiment of the present disclosure. In an embodiment, welding data can be collected at a log collection station 16 associated with a welding station 10. The control and log collection stations 16 can process data for one or more welds and/or weld stations 10. The data collection and/or processing can originate from pipeline construction, the weld station equipment, operator, welder or other data entry means. In non-limiting example, equipment processors, embedded processors, computers, sensors, process control devices, wired or wireless analog and digital devices and hand-held data processors can be used to gather, communicate and/or process weld station and/or weld system data. In an embodiment, one or more technicians can control the weld station(s) 10 and control and log collection station(s) 16. There is no limit to the number of log collections stations 16 which can be used with uLog. The log collection station 16 together with the weld station 10 for a welding system 22.

Figure 5:
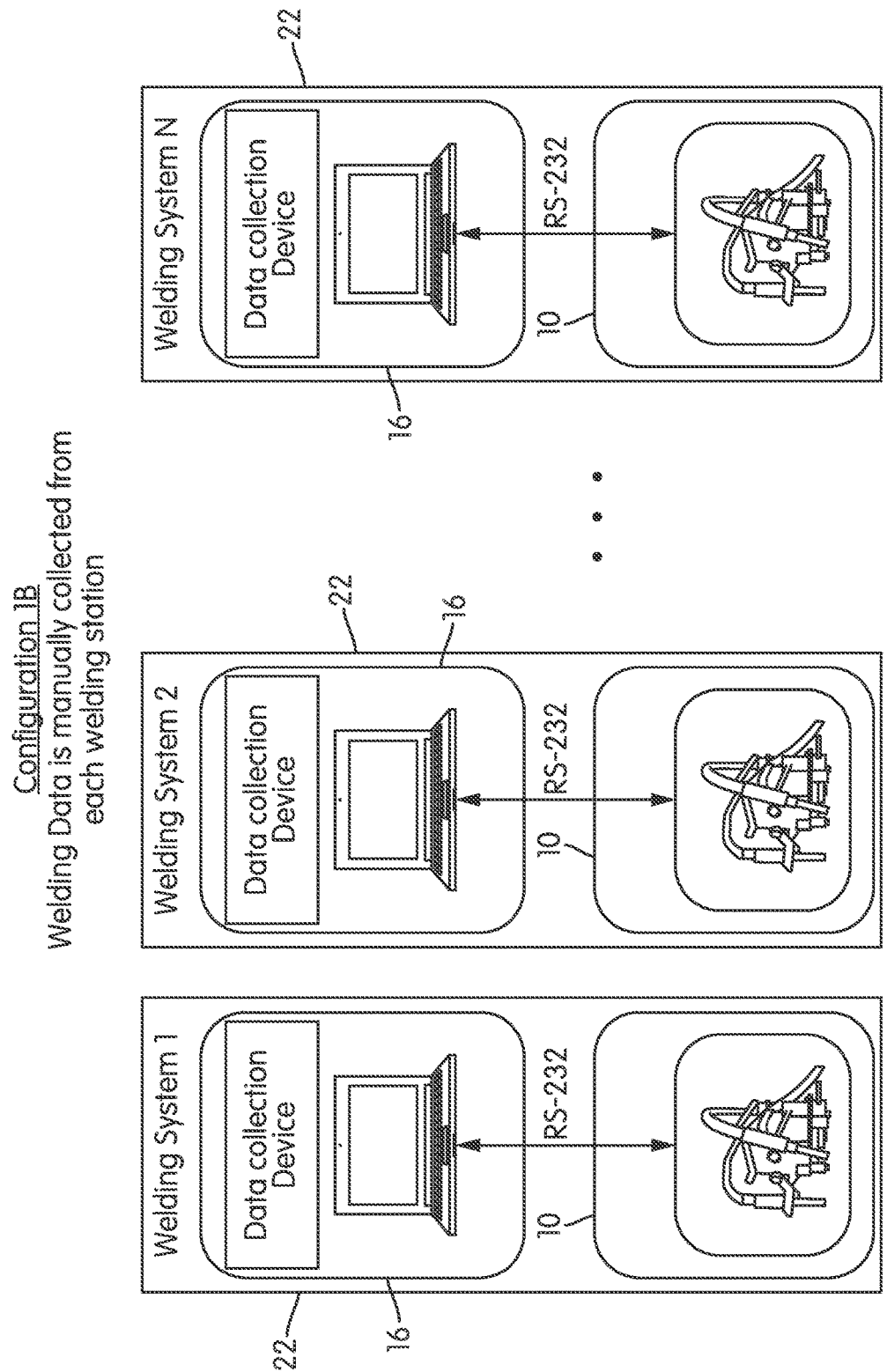
FIG. 5 is a schematic diagram of a system with a plurality of welding stations in communication with a plurality of control and log collection stations, according to another embodiment of the present disclosure.

FIG. 5 is a schematic diagram of a system with a plurality of welding stations 10 in communication with a plurality of control and log collection stations 16, according to another embodiment of the present disclosure. In an embodiment, welding data can be collected from each welding station 10 or welding system 22. In another embodiment, welding data can be collected from a number of stations or welding systems 10. There is no limit to the number of welding stations 10 and/or welding systems 22.

Figure 6:
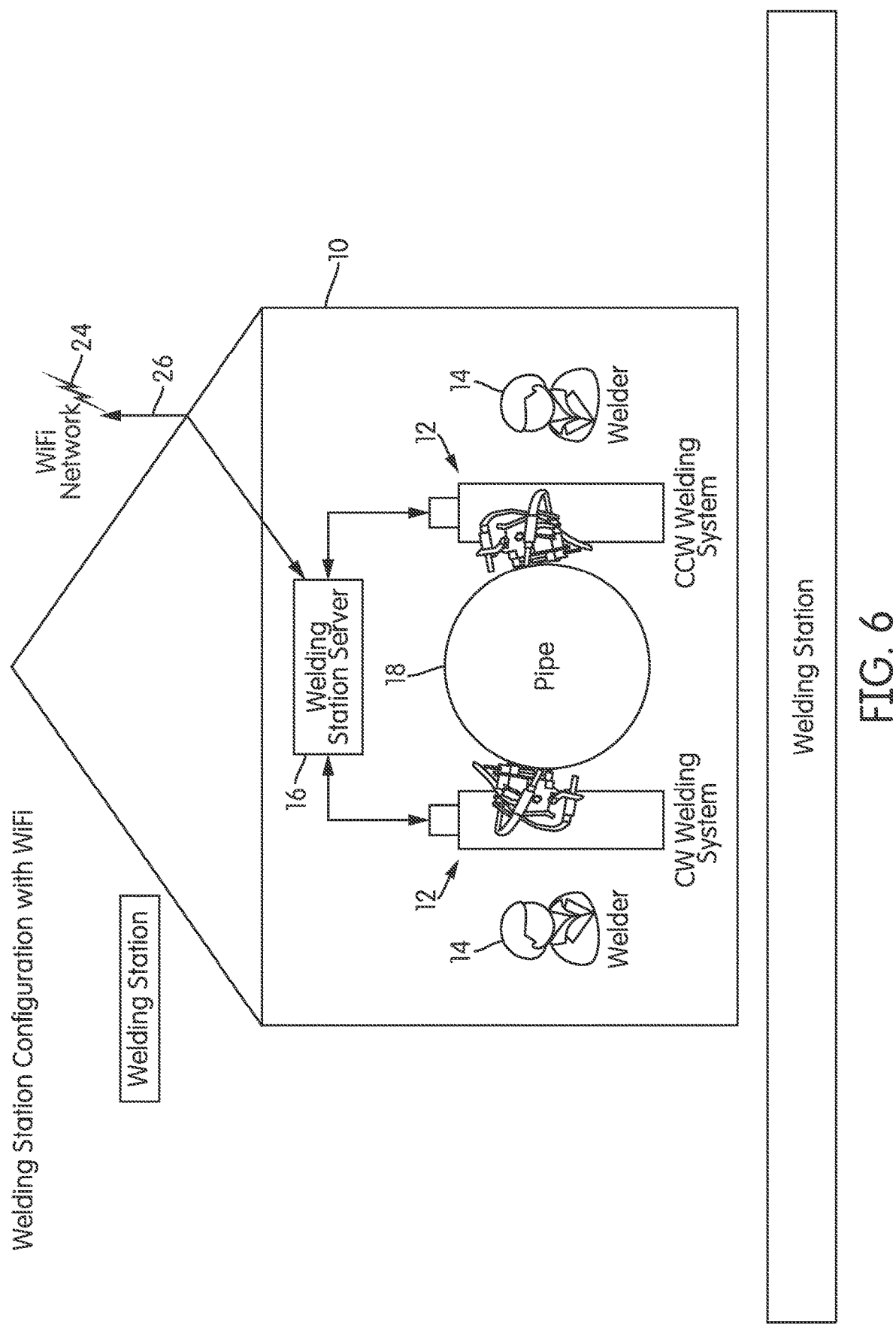
FIG. 6 is a schematic diagram of welding station in communication with a network via a WiFi connection, according to an embodiment of the present disclosure.

FIG. 6 is a schematic diagram of welding station 10 in communication with a wireless network 24 via a wireless connection (e.g., WiFi connection) 26, according to an embodiment of the present disclosure. For example, the welding station 10 can be provided with a wireless communications capability, such as Bluetooth, WiFi, cellular communication, satellite phone, or other wireless means. For non-limiting example, a welding station 10 can have one or more of a welding process computer, server or processing unit 16 which can gather and process welding system data. As shown in FIG. 6, the welding station 10 includes two welding machines or welding systems 12. In an embodiment, the weld systems 12 include an orbital weld system. One of the welding machines 12 is a clockwise (CW) welding machine or system and the other welding machine 12 is a counterclockwise (CCW) welding machine or system.

Figure 7:
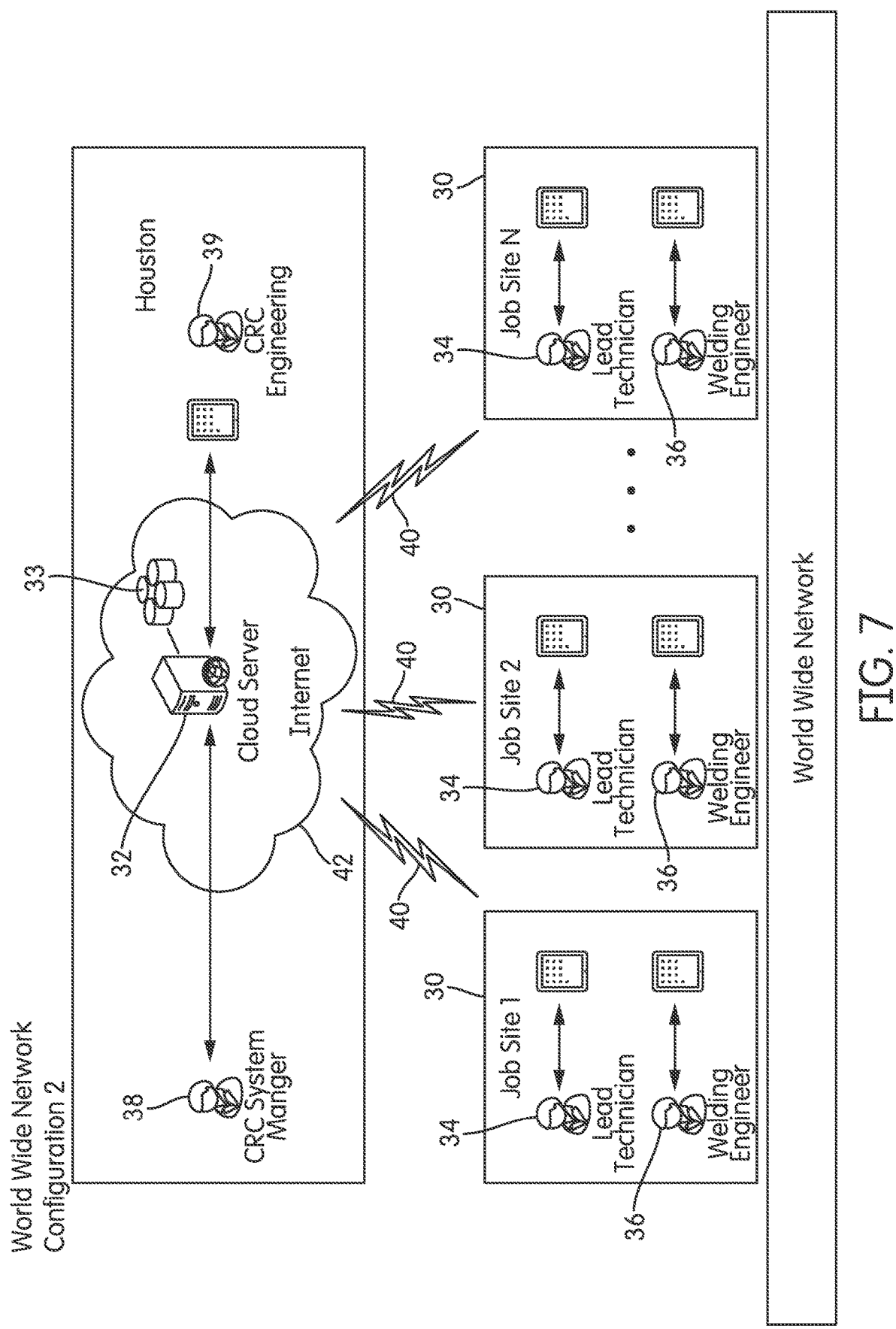
FIG. 7 is a schematic diagram of a plurality of job sites in communication with a cloud server via a worldwide network (internet), according to an embodiment of the present disclosure.

FIG. 7 is a schematic diagram of a plurality of job sites 30 in communication with a cloud server 32 via a worldwide network (internet), according to an embodiment of the present disclosure. The uLog can be configured on a local, regional, project or worldwide basis. The implementation of the uLog is without geographic limitation. One or many jobsites 30 can be networked with the uLog. In an embodiment, users, personnel, managers, engineers, departments, companies, specialists, workers, customers and a multitude of other parties can be networked to uLog. Each job site 30 includes a welding station 10 operated by welder 14 (as shown in FIG. 2), a lead technician 34, and a welding engineer 36, etc. Each job site 30 is configured to communicate with the cloud server 32 via a dedicated communication line or communication channel 40 or via the internet 42. The cloud server 32 can be accessed by a system manager 38 and Engineering 39. A storage device 33 in communication with the cloud server can be provided for storing welding data.

Figure 8:
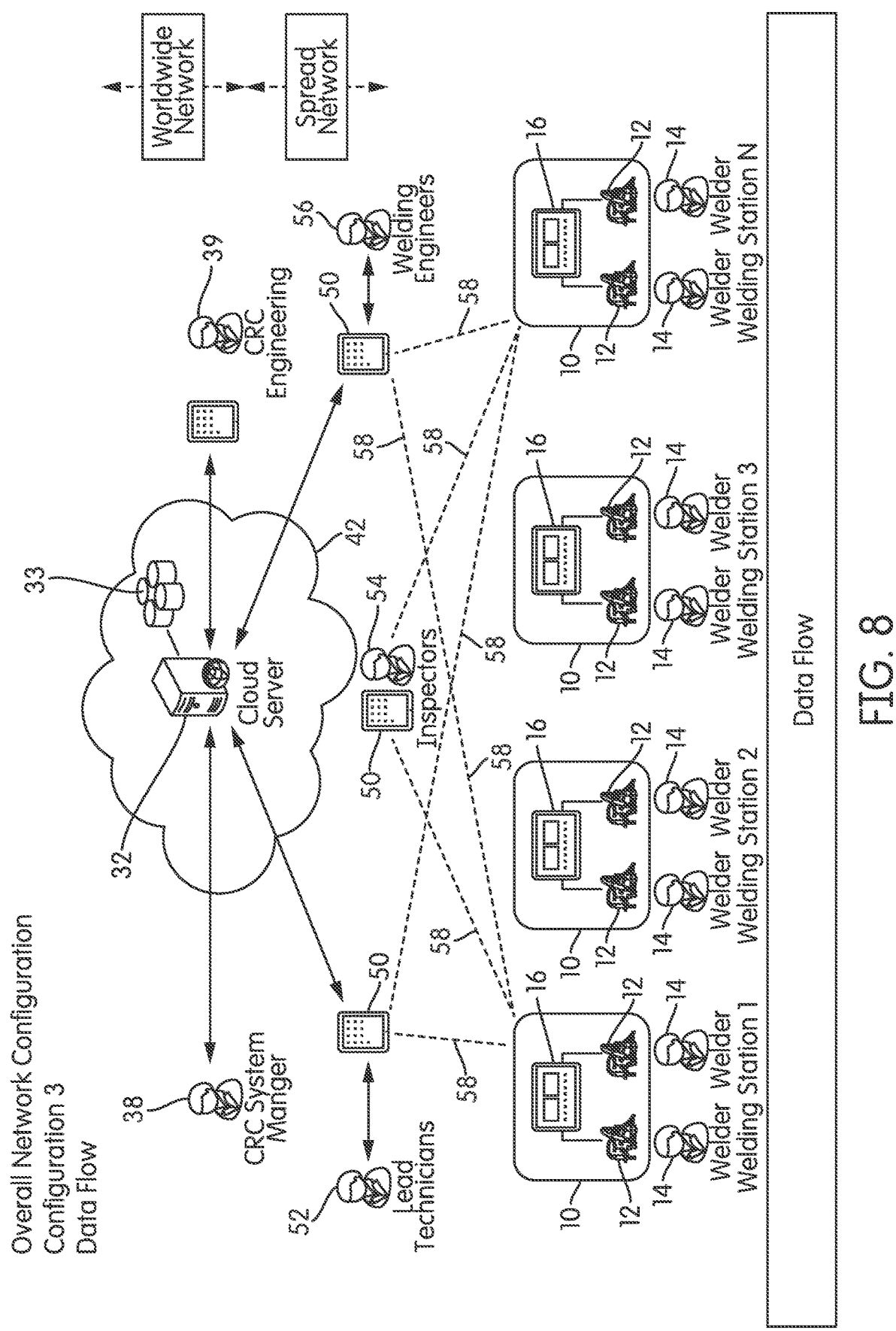
FIG. 8 is a schematic diagram of a plurality of welding stations in communication with intermediate computing devices (lead technicians, inspectors, engineers, etc.) which are in turn in communication with a cloud server through the internet, according to an embodiment of the present disclosure.

FIG. 8 is a schematic diagram of a plurality of welding stations 10 in communication with intermediate computing devices 50 operated by technical managers (lead technicians 52, inspectors 54, engineers 56, etc.) through communication channels or lines 58, according to an embodiment of the present disclosure. For example, each welding station 10 can communicate with one or more of the intermediate computing devices 50. Similarly, each intermediate computing device 50 is configured to communicate with one or more of the welding stations 10. The intermediate computing devices 50 are in turn configured to communicate with cloud server 32 through the internet 42. Portions of the uLog program are configured to run on the cloud server 32, other portions of the uLog are configured to run on the intermediate computing devices 50 and yet other portions are configured to be implemented on the welding station computer/server 16. Each portion or component of the uLog operates in synergy with other portions or components to provide a seamless management of the overall system. In an embodiment the uLog can optionally have differentiated worldwide network capabilities and spread network capabilities. In another embodiment, all capabilities are fully integrated; and in yet another embodiment can be without differentiation.

Figure 9:
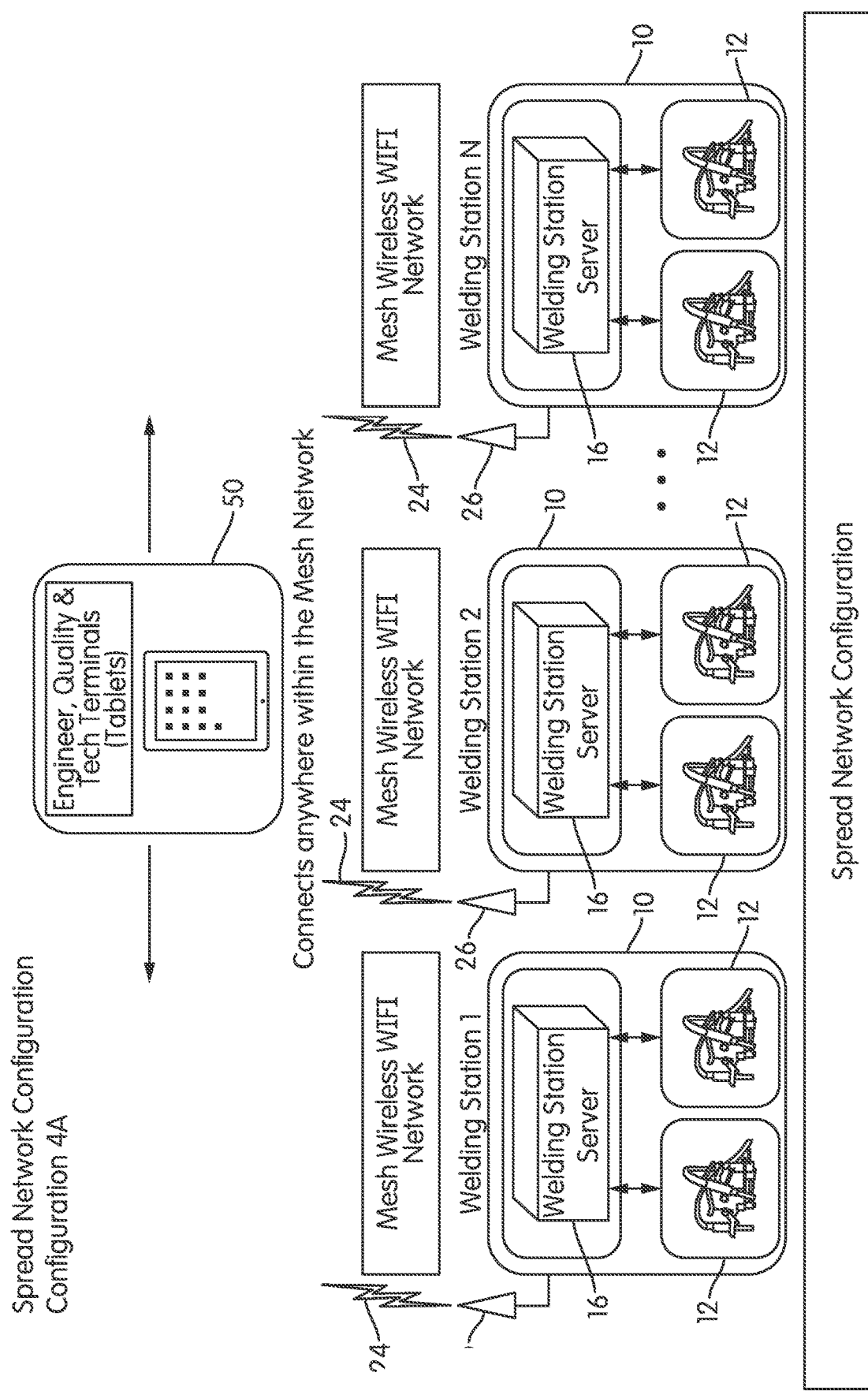
FIG. 9 is a schematic diagram of a plurality of welding stations in communication with an intermediate computer system (Engineer, quality and Tech terminals) through a wireless (e.g., WiFi) communication channel, according to an embodiment of the present disclosure.

FIG. 9 is a schematic diagram of a plurality of welding stations 12 in communication with an intermediate computer system 50 (operated by Engineer, Quality and Tech terminals) through a wireless (e.g., WiFi) communication channel 26 to wireless communication network 24, according to an embodiment of the present disclosure. The intermediate computer system can be any type of a computing device including a tablet, a phone, smartphone, PDA and/or other wireless device(s) for data entry, processing, communications, input, output and other functions. The intermediate computer runs the uLog program and can be operated by engineering, quality control, users, supervising technicians and others. In an embodiment, the uLog running at the intermediate computer 50 provides data, processes data and communicates data or information with the welding station computer 16 located at each of the welding stations 10.

Figure 10:
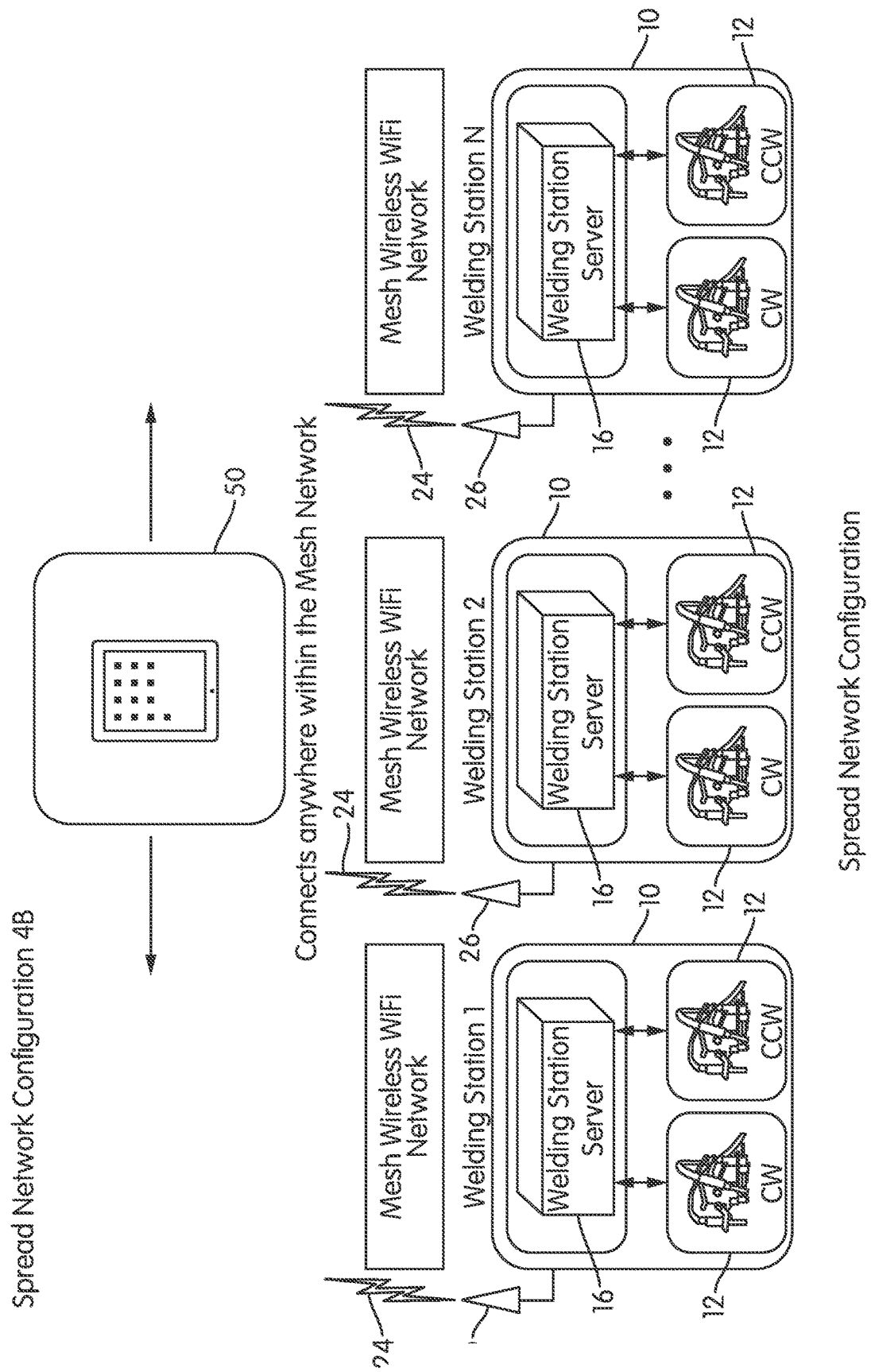
FIG. 10 is a schematic diagram of a plurality of welding stations in communication with a computer system through a wireless (e.g., WiFi) communication channel, according to an embodiment of the present disclosure.

FIG. 10 is a schematic diagram of a plurality of welding stations 10 in communication with intermediate computer system 50 through a wireless (e.g., WiFi) communication channel 26 into wireless communication network 24, according to an embodiment of the present disclosure. FIG. 10 shows a spread network configuration. Intermediate computer system 50 has wireless capability such as WiFi or Cellular (3G, 4G, etc.) allowing it to communicate wirelessly with any of the welding stations 10. The intermediate computer 50 can be any type of mobile wireless device, such as a smartphone, table or PDA that can connect anywhere in the wireless network 24. In an embodiment, the uLog program or system can use a mesh network processing data through a mesh wireless (e.g., WiFi) network 24. For example, a welding station server 16 of a welding station 10 can communicate with a uLog device 50 via a mesh wireless network 24 and can connect anywhere within the mesh network 24. In an embodiment, mesh networking can be used in a spread network configuration.

Figure 11:
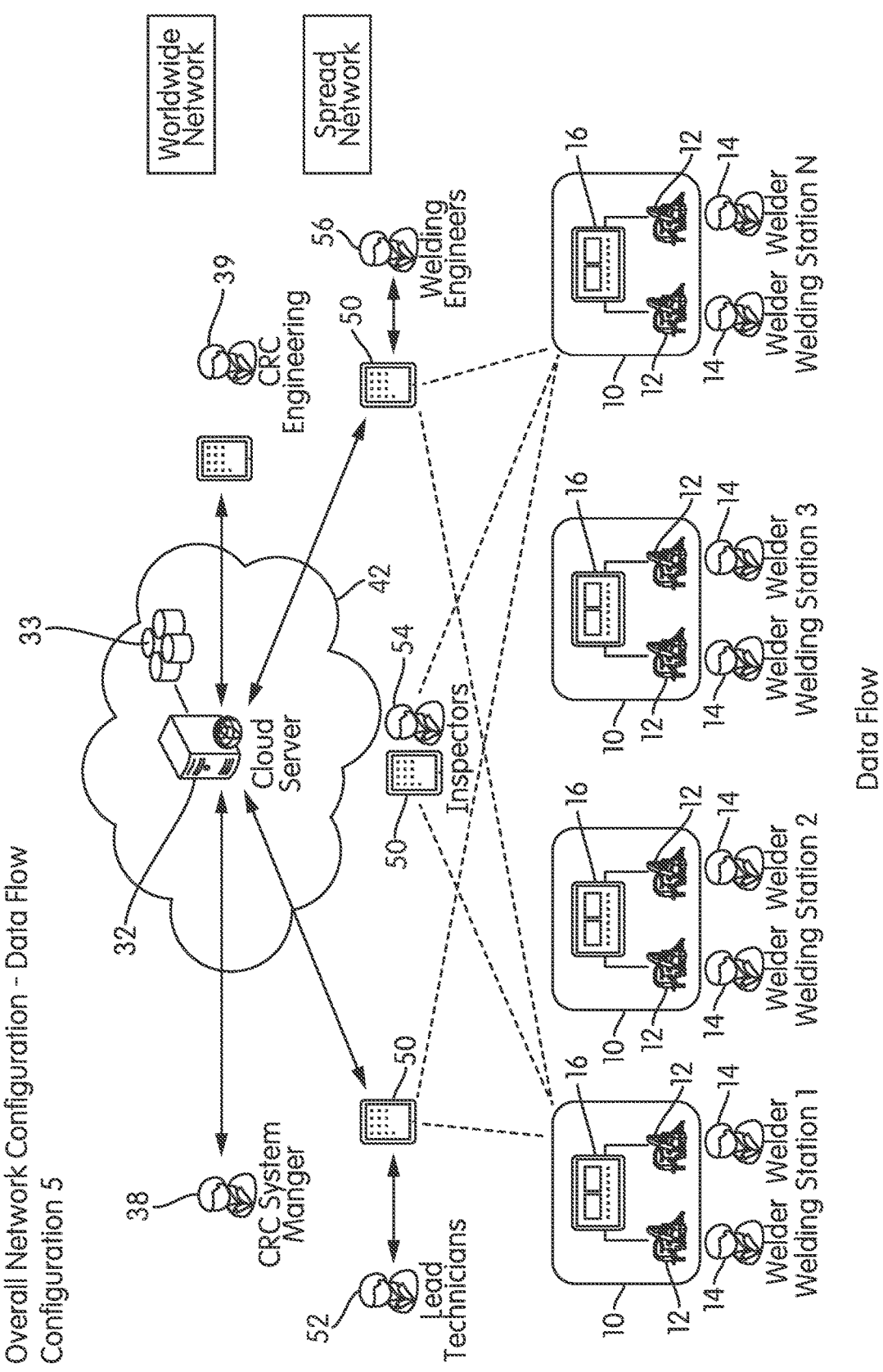
FIG. 11 is a schematic diagram of a plurality of welding stations in communication with a plurality of intermediate computer systems (Engineer, quality and Tech terminals) which in turn are in communication with a cloud server, according to an embodiment of the present disclosure.

FIG. 11 is a schematic diagram of a plurality of welding stations 10 in communication with a plurality of intermediate computer systems 50 (operated by Engineer 56, inspectors 54, lead technician 52, etc.) which in turn are in communication with cloud server 32, according to an embodiment of the present disclosure. FIG. 11 shows a data flow diagram for an overall network configuration. In an embodiment, the overall network configuration can be a worldwide network configuration. The overall network configuration can be used by managers, engineers, inspectors, technicians, lead technicians, welding engineers, welders and weld stations, as well as others. In an embodiment, the uLog overall network configuration can optionally have data flow differentiated by worldwide network capabilities and spread network capabilities. In another embodiment, all capabilities are fully integrated without differentiation. Similar to the configuration shown in FIG. 8, for example, each welding station 10 can communicate with one or more of the intermediate computing devices 50. Each intermediate computing device 50 is configured to communicate with one or more of the welding stations 10. The intermediate computing devices 50 are in turn configured to communicate with cloud server 32 through the internet 42. Portions of the uLog program are configured to run on the cloud server 32, other portions of the uLog are configured to run on the intermediate computing devices 50 and yet other portions are configured to be implemented on the welding station computer/server 16. Each portion or component of the uLog program or system operates in synergy with other portions or components to provide a seamless management of the overall system. In an embodiment the uLog can optionally have differentiated worldwide network capabilities and spread network capabilities. In another embodiment, all capabilities are fully integrated; and in yet another embodiment can be without differentiation.

Figure 12:
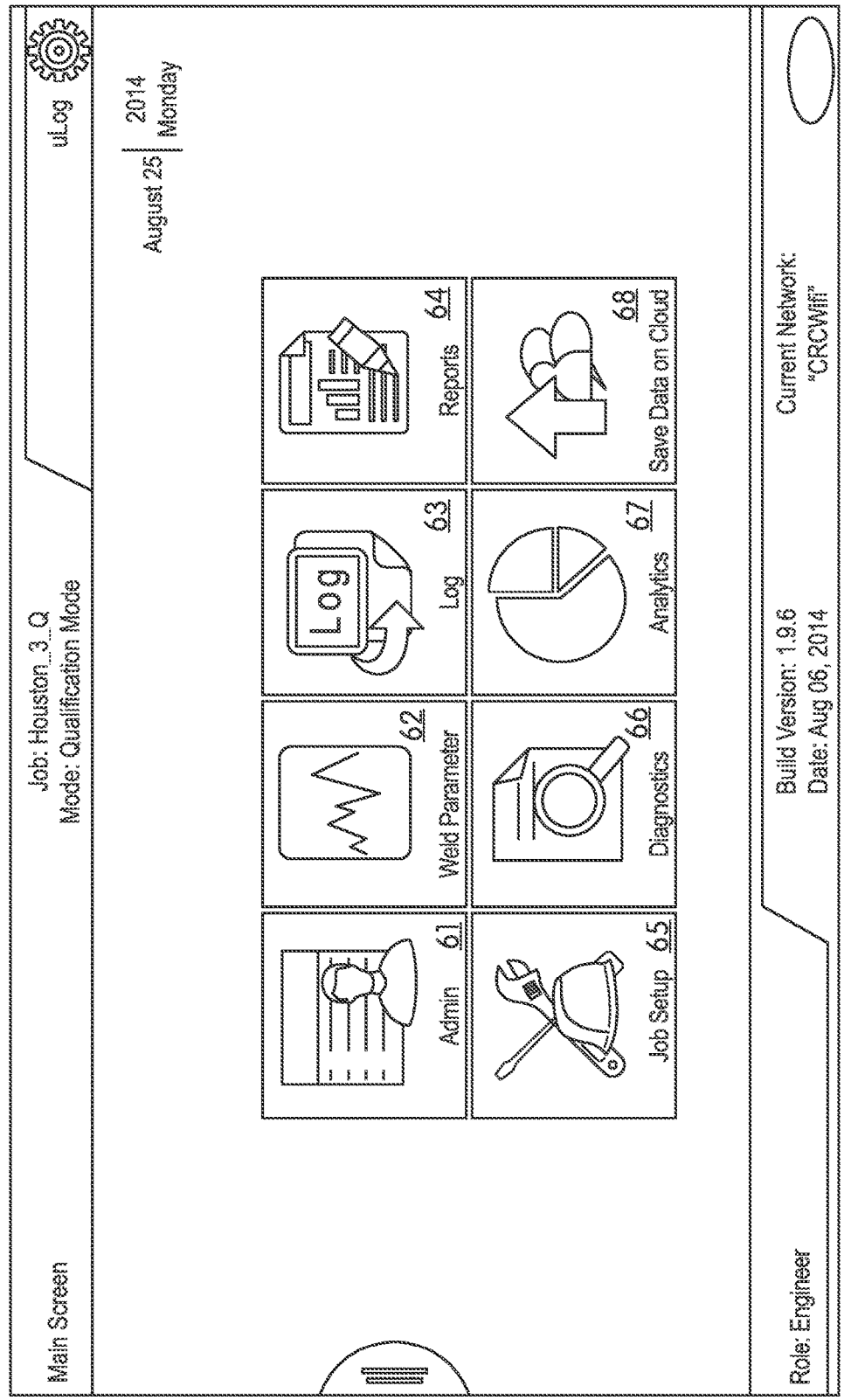
FIG. 12 shows an example graphical user interface ("GUI") for a "Main Screen" of an application for cloud based universal data logging (uLog) implemented by a computer system at the welding station, at the intermediate computer system or at the cloud server, according to an embodiment of the present disclosure.

FIG. 12 shows an example graphical user interface ("GUI") for a "Main Screen" 60 of an application for cloud based universal data logging (uLog) implemented by a computer system at the welding station 10, at the intermediate computer system 50 or at the cloud server 32, according to an embodiment of the present disclosure. In an embodiment, the uLog provides numerous features for data retrieval, data analysis, data analytics, data mining, data logging and reporting. The GUI 60 includes a plurality of icons 61 through 68. Each icon when activated (for example by a mouse click or by finger touch) opens an application. For example, icon 61 is associated with application Admin configured to be operated by the administrator for setting up administrative features of the uLog. The icon 62 is associated with Weld parameters configured for inputting weld parameters. The icon 63 is associated with the function "Log." The icon 64 is associated with "Report". The icon 65 is associated with "Job Set up." The icon 66 is associated with "Analytics." The icon 68 is associated with uploading and saving data on the Cloud (i.e., saving data on the cloud server 32 or storage device 33. Therefore, as it can be appreciated, the uLog universal logging functionalities can include, but are not limited to processing data and information regarding: administration, weld parameters, logs, records, reports, job setup, inspection, quality control, coating, pipe handling, user and/or administrative diagnostics, analytics and data for processing locally and/or by cloud-based means.

The scope of this disclosure encompasses the methods and means to achieve the disclosed pipeline welding and construction support, as well as encompassing any article, product, means, and methods for producing and using any software, application, computer executable code, programming, logical sequences, or other form of electronic or automated means to achieve and/or use the methods herein. Such products, articles and means include for example, but are not limited to, a software application product provided on a fixed media, such as a disk, or in a physical memory, or in a memory stick, or as a software application product, or as an application provided by digital download, or provided by other means. This application expressly encompasses installed, uninstalled, compiled and not compiled versions of any software product or equivalent product capable of being used, implemented, installed or otherwise made active to use, achieve and/or practice the methods disclosed herein. In addition to its normal and customary meanings, the recitation "computer readable program code means" is intended to be broadly construed to encompass any kind and type of computer readable program code, executable code, software as a service, web service, cloud service, or cloud-based process, embedded application, software application product provided on a fixed media, such as a disk, or in a physical memory, or in flash memory, or in a memory stick, or as a software application product, or as an application provided by digital download, or encoded on programmable hardware, or provided by other means which can be employed to make, use, sell, practice, achieve, engage in, produce, function or operate the methods disclosed herein. The application is to be broadly construed in this regard and not limited to any means of delivery or to any product form for providing or using, achieving and/or practicing the computer readable program code products, means and/or methods disclosed herein. In embodiments, all of the methods herein can be produced and provided to a user as a software product(s), software application(s), computer readable program code means(s) or any other article(s) or device(s) which can be used to achieve any, some or all of the results, calculations and/or numerical methods disclosed herein.

In an embodiment, a user can setup a job locally or in the cloud. In a cloud-based example, a user can use and/or inherit job related information from the cloud to be retrieved by or pushed to the user's device and or machine (e.g., computer 16 associated with welding machine 12). Setup of a job on or by means of the Cloud, can activate device 16 to inherit the job related information from the cloud to be pushed to the device and/or machine 16. In another embodiment, uLog provides single point data integrity maintenance. Machine to cloud (M2C) and cloud to machine (C2M) data storage and retrieval are also functions provided by uCloud.

In an embodiment, a centralized location can be used where the details of the job client can be entered, processed and maintained, or retrieved automatically by uLog. The uLog can also use a distributed approach to data management and processing. The uLog can create and attach job specific parameter files to be deployed on a job managed by the right authorities with assigned user privilege levels. This job related information can be inherited by the assigned user and pushed to computers 16 associated with welding machines 12 (cloud to machine; "C2M"). Changes made to the job related information are collected from computers 16 associated with welding machines 12 and synced (synchronized) back to the (machine to cloud; "M2C") cloud (i.e., cloud server 32). The cloud server 32 provides a single point where some or all data are processed by uLog.

The uLog can process, record analyze and use data from one, more or all of the following types of equipment: welding machines, pipe bending equipment, pipe handling equipment, end prep equipment, clamps, padding and/or crushing equipment, double jointing equipment and/or systems, weighting equipment and/or systems, conveying equipment and/or systems, laybarge equipment and construction/management systems. The uLog can also be an enterprise resource planning (ERP) system or work with an ERP system.

The uLog can use and/or process data from any one or more of the following types of welding equipment. Such welding equipment can be for example, but is not limited to: manual welding equipment, automatic welding equipment, external welding machine, internal welding machine, a single torch welder, a dual torch welder, a multitorch welder, high productivity welding systems, an inspection system, an internal inspection system, an external inspection system.

The uLog can use and/or process data from any one or more of the following types of pipe bending equipment: bending machines, wedge mandrels, hydraulic wedge mandrels, plug mandrels, hydraulic plug mandrels, pneumatic mandrels, pneumatic wedge mandrels. The uLog can use and/or process data from any one or more of the following types of pipe handing equipment: DECKHAND® equipment (CRC-Evans, Houston, Tex.), vehicles, construction vehicles and equipment adapted to produce a data for use or processing. The uLog can use and/or process data from any one or more of the following types of equipment: bending sets and dies, angle measurement equipment and devices, compressors, cradles, booms and/or supports, demagnetizing equipment, tires, wheels, and track wheels.

The uLog can use and/or process data from any one or more of the following types of equipment: an end prep station for increasing land on pipe bevel, line-up station for pipe alignment and an external weld, capping fill station for applying external weld cap, internal weld station for applying internal weld, power trailer or containers with diesel generator and welding rectifiers, pipe skids and supports for transferring the pipe from station to station, internal pneumatic line-up clamps and pipe facing machines, sub-arc welding machines and processing equipment.

The uLog can also use and/or process data from any one or more of the following types of equipment: Laybarge Equipment, pipe handling, double jointing, joint coating equipment, coating equipment, onshore equipment, offshore equipment, deepwater equipment, shallow-water equipment, roller units, conveyers, pipe transfer equipment, support frames, support units, roller modules, longitudinal conveyer roller modules, pipe elevators, pipe supports, roller type pipe supports (PSA and PSF), pipe transfer carriages, PTC-V pipe transfer carriages, stern pipe supports, adjustable height pipe supports, SPSA roller-type stern pipe support, TPSA track-type pipe support, transverse conveyers, walking beam type conveyers and TV-C-W transverse conveyers.

The uLog can use and/or process data from any one or more of the following types of processes and methods: welding, pipe welding, pipeline welding, coating, joint coating, field joint coating, inspection, quality assurance, non-destructive testing, heat treatment, management, offshore management, onshore management, managed services, welding support, spoolbase management and micro-alloying.

In an embodiment, uLog can be used for deployment of daily job statistics from cloud and from mobile device. Creation of PQR and/or WPS and/or daily reports can be produced from a mobile platform and/or on cloud, or by other means. Analytics of collected data on cloud and mobile device provide feedback to the control system to improve quality and defect prediction. In an embodiment uLog provides integrated pipe joint tagging, synced with data logs. The uLog can also use single point Capture of data logs, provide machine setup information and process software revisions.

The uLog can also execute automatic error reporting of machine status, automatically stamp a job location on job records, as well as perform synchronized capture of job related parameter change notes from all users for a given project. Additionally, Consolidated Project related report to customers from single point can also be generated by uLog.

Figure 13:
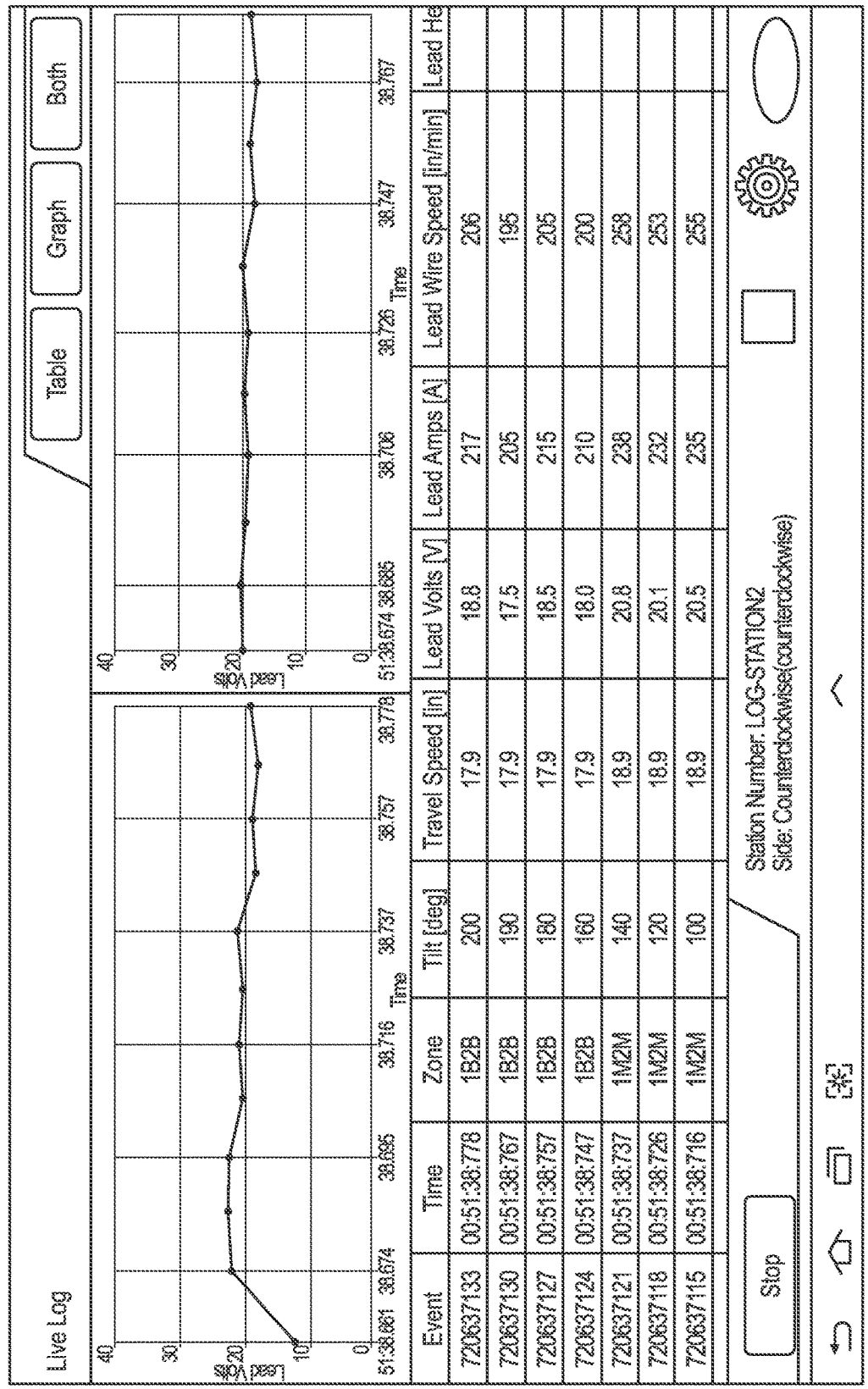
FIG. 13 shows an example GUI for a "Live Log" screen of the application for cloud based universal data logging (uLog) showing voltages versus time at one welding station, according to an embodiment of the present disclosure.

FIG. 13 shows an example GUI for a "Live Log" screen of the application for cloud based universal data logging (uLog) showing voltages versus time at one welding station, according to an embodiment of the present disclosure. In an embodiment, the uLog executes a centralized data capture of data from all pipe welding handling, coating related machines, as well as each of the types of data relevant to such machine and activities. Current live activity summary for weld, coating and inspection can be generated. Various parameters are reported on a table including: an event number, a time stamp, a zone identification, a tilt in degrees of the welding device or weld system, a travel speed of the welding device, a lead volts or voltage applied to the weld wire, a lead amps (A) or current applied to the weld wire, a lead wire speed or the speed of the weld wire, etc. For example, various parameters including lead weld wire speed (i.e., speed of the weld wire) and the speed of the welding device (travel speed), as well as other parameters can be reported in a form of table and/or graphs. In addition, a voltage applied to the weld wire can also be displayed in a table and/or as a graph versus time.

Optionally, electronic signatures to PQR/WPS documents can be supported by uLog. Optionally, the uLog can process system parameter version control and rollback. In an embodiment, the uLog also has functionalities for deployment of daily job statistics from cloud and/or mobile devices. For non-limiting example, the uLog can execute data management and can provide the user reports regarding the number of welds done for a given time period (e.g., per hour, in one day, in one week, etc.) and can report the amount of a consumable (e.g., welding material) used for a given period (e.g., per hour, in one day . . . ) or other measure. Job and error reports can also be produced by uLog.

In an embodiment, uLog can send an email and/or SMS (text message) or other notification to appropriate authorities. The uLog can also be used to for financial functions, accounting auditing, time keeping and other management tasks. For example, the uLog can invoice a customer in a timely manner. In an embodiment, the invoice can be generated based on the number of welds, or based on the use and/or waste of consumable. The uLog provides a quantification system and supports the efficient invoicing and accounting of pipeline welding projects.

The uLog can also be used for automatic resupply of materials and/or equipment and/or other resources or inventory on a project. The many and varied functions of the uLog disclosed herein can reduce disruption on the job, downtime, wastage and other negative occurrences during construction.

FIG. 14 shows an example GUI for a "Get Log" screen of the application for cloud based universal data logging (uLog) showing weld data parameters including type of weld event, time, zone, weld travel speed (travel speed of the welding system), lead wire travel speed (weld wire speed), according to an embodiment of the present disclosure. FIG. 14 shows various parameters that are reported on a table including: a weld identification or type number, an event number, a time stamp, a zone identification, a tilt in degrees of the welding device or weld system, a travel speed of the welding device, a lead volts or voltage applied to the weld wire, a lead amps (A) or current applied to the weld wire, and a lead wire speed (the speed of the weld wire). In an embodiment, uLog can automatically stamp job location on job records. In other examples, the data logs can be time stamped and can reflect the time zones, as shown in the table depicted in FIG. 14. Time stamps can be synchronized from the GPS and/or based upon data present and/or pushed to the uLog such that the logs reflect the time zone they were captured in.

Figure 15:
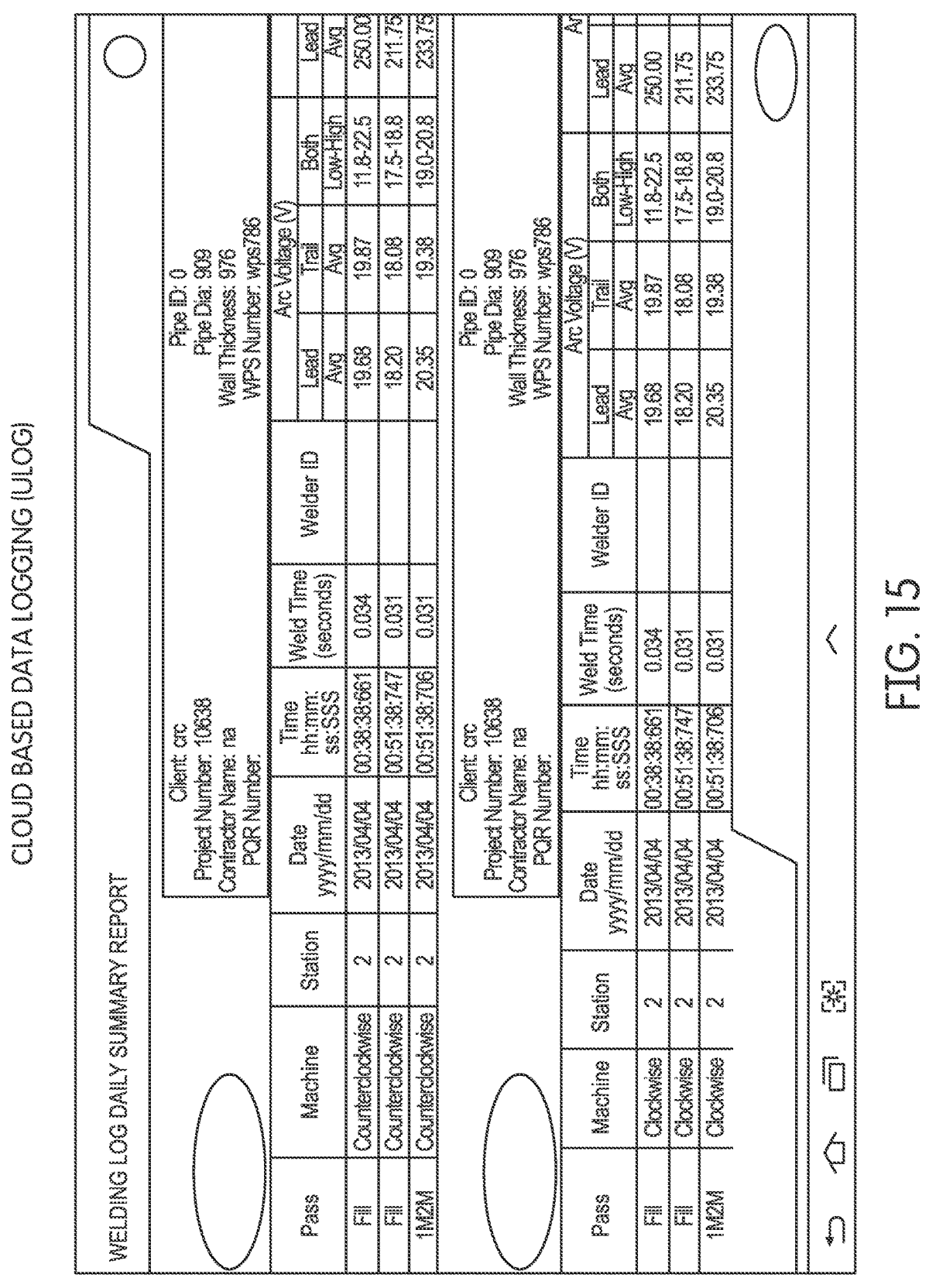

FIG. 15 shows an example GUI for a summary report screen of the application for cloud based universal data logging (uLog) displaying various welding parameters including weld time, weld station identification number, weld arc voltage, etc., according to an embodiment of the present disclosure. In an embodiment, uLog can create and/or generate PQR and/or WPS and/or summary reports and/or daily reports all done from mobile platform and on cloud. PQR, WPS, summary and daily reports can be manually produced or automatically generated. The uLog can generate one, more or all of these types of reports on a schedule, ad hoc or simultaneously. The uLog provides the benefit of processing common and consistent data. The same collected data can be used to generate reports at the same or different locations and/or output devices.

Rules of reporting can be established on uLog and can be configurable. In an embodiment, critical data for a given project can be synchronized on cloud. The uLog provides for the creation of a project qualification binder that is to be sent to user and/or client of a user and/or other recipient at the end of a qualification process with electronic signatures for approval. The uLog reduces time and expense in creation of these reports and approved documents.

Figure 16:
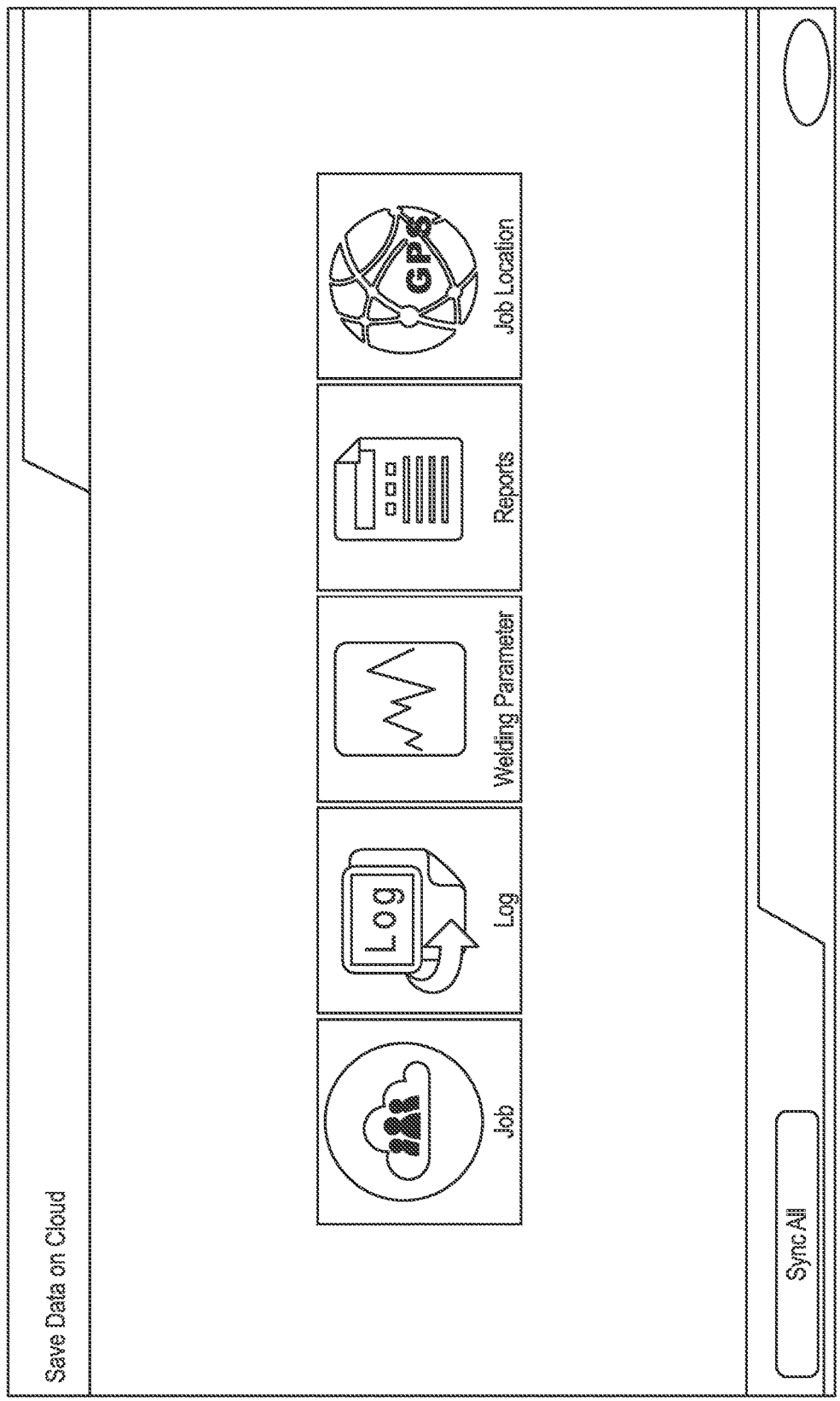
FIG. 16 shows an example GUI for a "Save Data on Log" screen of the application for cloud based universal data logging (uLog) displaying various, according to an embodiment of the present disclosure.

FIG. 16 shows an example GUI for a "Save Data on Log" screen of the application for cloud based universal data logging (uLog) displaying various, according to an embodiment of the present disclosure. The uLog provides data storage services of an unlimited nature. The pipeline construction industry is worldwide and its projects can be geographically dispersed. Additionally, pipeline construction can occur under harsh environments and climates. The uLog allows data to be stored and protected from anywhere a user and/or equipment can be present. The data can also be synchronized or otherwise processed. For example data can be saved to the cloud from a job, log, welding station, weld parameter, reports and job locations. In an embodiment location data can be saved in addition to technical and/or management data.

Figure 17:
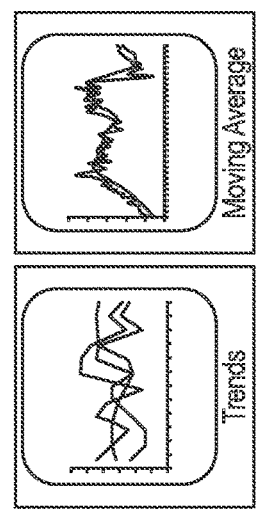
FIG. 17 shows an example GUI for an "Analytics" screen of the application for cloud based universal data logging (uLog) showing two icons for selecting a type of analysis performed (e.g., trends, moving average), according to an embodiment of the present disclosure.

FIG. 17 shows an example GUI for an "Analytics" screen of the application for cloud based universal data logging (uLog) showing two icons for selecting a type of analysis performed (e.g., trends, moving average), according to an embodiment of the present disclosure. In an embodiment, uLog analytics can process and provide data trends, moving averages and/or any type of data processing which a user requires. In an embodiment, uLog can have pipeline data cloud logging, reporting and analytics systems. For example, analytics can be conducted on collected data to provide feedback to the control system to improve quality and defect prediction of welds and/or construction equipment, activities and operations. In an embodiment, data can be collected by means of the cloud and/or one or more mobile devices. In an embodiment, the uLog supports a synchronized capture of job related parameter change notes from all users for a given project. In another embodiment, uLog can monitor, analyze and report current live activity and provide live summary data and summary report(s) for welding, coating and inspection activities. The uLog system can execute system parameter version control and rollback. The uLog system also achieves single point capture of data logs, machine setup information and software revisions. In yet another embodiment, integrated pipe joint tagging can be achieved and synced with data logs.

Figure 18:
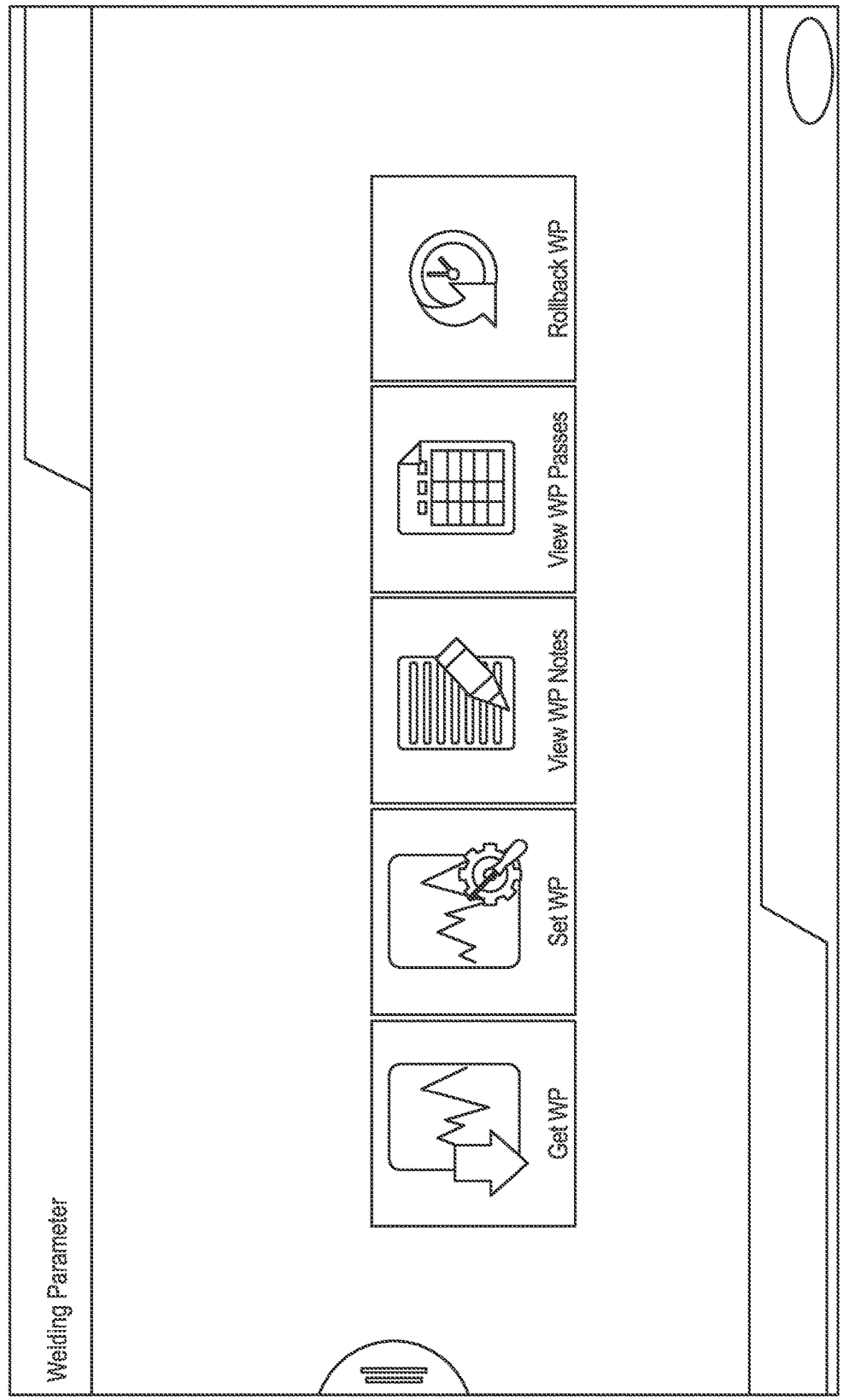
FIG. 18 shows an example GUI for a "Welding Parameter" screen of the application for cloud based universal data logging (uLog) showing two various for selecting a type of function to be performed (e.g., get welding parameters (WP), set welding parameters (WP), view welding parameters WP . . . ), according to an embodiment of the present disclosure.

FIG. 18 shows an example GUI for a "Welding Parameter" screen of the application for cloud based universal data logging (uLog) showing two various mechanisms for selecting a type of function to be performed (e.g., get welding parameters (WP), set welding parameters (WP), view welding parameters WP . . . ), according to an embodiment of the present disclosure. In an embodiment, uLog cloud based logging can execute any of the following activities and/or processes: get weld parameters, set weld parameters, view and process weld parameter notes, view and process weld parameter passes, as well as rolling back weld parameters. In an embodiment the uLog can contain any, more or all of the following: Pipeline Miles reward(s) functionalities, Pipe Miles functionalities, uLog functionalities, M2C functionalities and C2M functionalities.

A welder or weld technician may waste weld wire if the welder replaces the spool too soon before most of the wire is consumed. In addition, the welding process can be interrupted if the spool runs out of wire during the weld process causing downtime and defect repair. One method to address these problems in the present embodiment is to rely on wire feed motor speed to determine lead wire speed and thus determine the length of weld wire that is consumed during a certain period of time. However, this method may carry errors due to slippage of the wire on the wire feed motor wheel or incorrect starting weight. As a result, a determination of the length of wire based on the speed of the motor may not be accurate. In addition, an incorrect starting weight may lead the user to believe that enough wire is available in the spool to perform a weld (if the initial or start weight is over estimated for example) whereas in reality the amount of wire remaining in the spool is not sufficient to complete a weld. In order to cure this deficiency, a device is used to measure the weight of the spool of wire in real time while the motor pulls the wire weld. By measuring the weight of the spool, the user or welder can determine if enough wire is remaining in the spool to complete a weld before the weld is started. As a result, the weight of the wire can be determined at all times which substantially eliminate the uncertainty due to slippage or unknown starting weight of the spool. Furthermore, the weight can be compared to the lead wire feed speed to determine whether the wire is feeding at the intended speed.

Figure 19A:
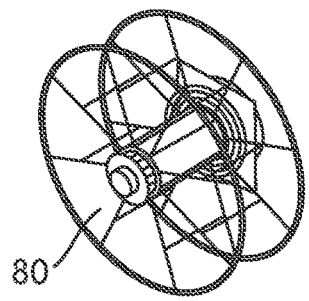
FIG. 19A depicts schematically an example of a spool that is configured to carry a weld wire, according to an embodiment of the present disclosure.
Figure 19B:
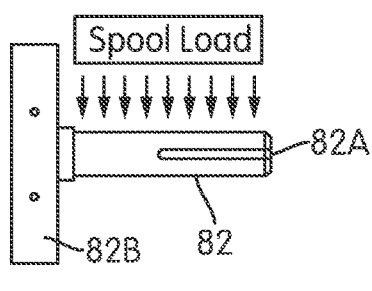
FIG. 19B depicts schematically a lateral view of a hub-transducer that is configured to measure a weight of the spool, according to an embodiment of the present disclosure.
Figure 19C:
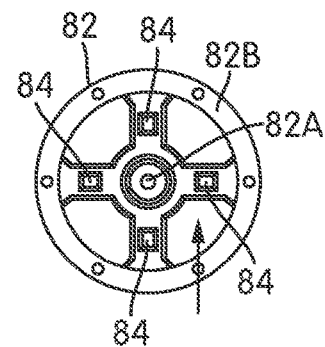
FIG. 19C depicts another lateral view of the hub-transducer showing the positioning of transducer elements or strain sensors/gauges for measuring weight strain when the spool is mounted on the hub, according to an embodiment of the present disclosure.

FIG. 19A depicts schematically an example of a spool 80 that is configured to carry a weld wire, according to an embodiment of the present disclosure. FIG. 19B depicts schematically a lateral view of hub-transducer 82 that is configured to measure a weight of the spool 80, according to an embodiment of the present disclosure. FIG. 19C depicts another lateral view of the hub-transducer showing the positioning of transducer elements or strain sensors/gauges 84 for measuring weight strain when the spool 80 is mounted on the hub 82, according to an embodiment of the present disclosure. As shown in FIG. 19B, when the spool is mounted on the hub 82, the weight of the spool will exert a force on the axle 82A of the hub 82 which will in turn exert a strain on the lateral hub 82B. Strain sensors 84 are provided on the lateral hub 82B to sense the strain applied by the weight of the spool. Examples of strain sensors that can be used to measure strain are piezo-electric elements. The strain sensors 84 convert a strain force into a measured voltage. Hence, by measuring the voltage, one can determine the weight of the spool 82. In an embodiment, a temperature sensor (not shown) can be provided in the hub and positioned to capture the temperature of the hub in order to apply corrections to the strain sensor measurement for a wide range of temperatures.

Figure 20:
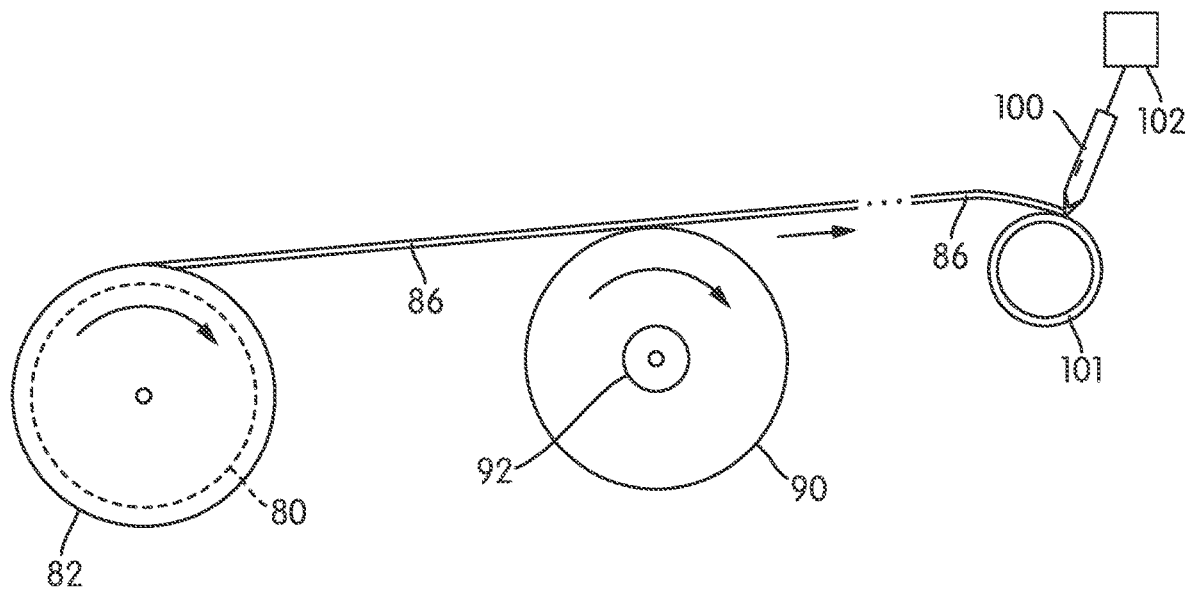
FIG. 20 depicts schematically an arrangement where a weld wire in spool mounted to hub is pulled by a motor assembly for feeding the wire 82 to the weld device (not shown), according to an embodiment of the present disclosure.

FIG. 20 depicts schematically an arrangement where a weld wire 86 in spool 80 mounted to hub 82 is pulled by a motor assembly 90 for feeding the wire 82 to the weld device (not shown), according to an embodiment of the present disclosure. The weld wire 86 is pulled by the motor assembly 90. In an embodiment, the rotation speed of the motor assembly (used to determine lead wire speed) can be measured by sensor 92. In an embodiment, the motor assembly uses a motor with an adequate rotational speed (rotation per minute or RPM measured by sensor 92) to achieve a desired feed speed of the wire to the weld device. In another embodiment, the rotation of the motor assembly can be changed according to a desired wire feed (lead wire speed) speed measured by sensor 92. The motor assembly 90 is configured to supply or feed weld wire 86 to the welding device 100 to weld a workpiece 101 (e.g., a pipe, etc.). A speed of the welding device 100 is measured by speed sensor 102. The speed sensor 102 is also configured to measure various parameters of the weld or weld data.

Figure 22A:
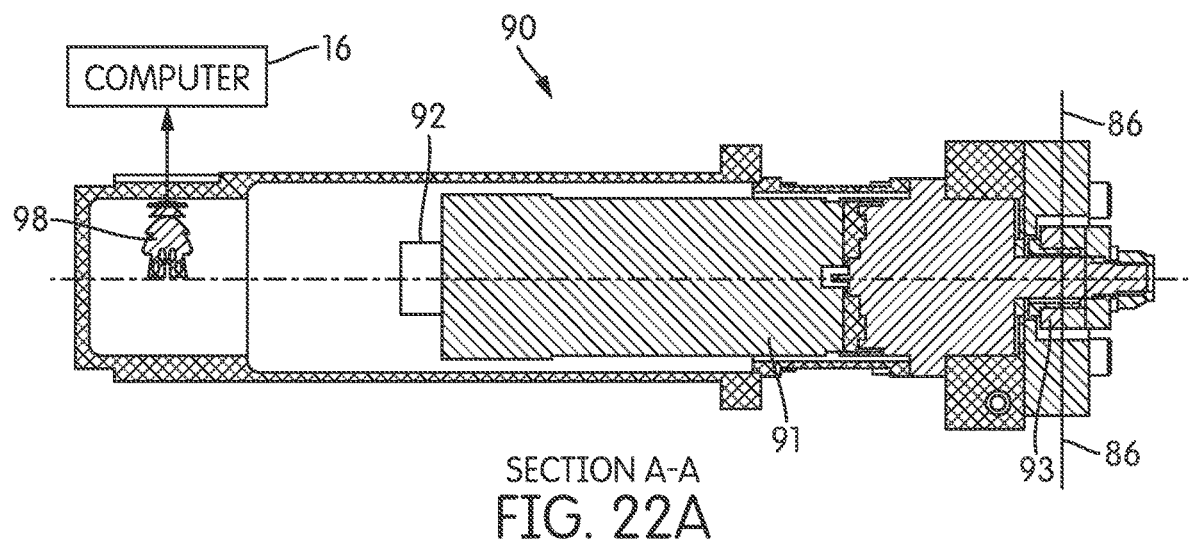
FIGS. 22A and 22B depict enlarged lateral cross-sections of the motor assembly, according to an embodiment of the present disclosure.
Figure 22B:
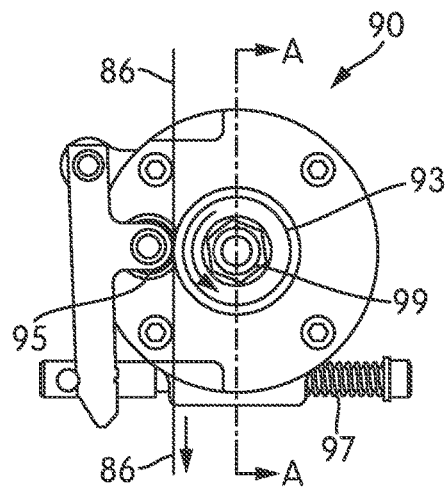

FIGS. 22A and 22B depict enlarged lateral cross-sections of the motor assembly 90, according to an embodiment of the present disclosure. As shown, the motor assembly includes a motor 91 and feed wheel 93. The motor 91 engages the feed wheel 93 to rotate the feed wheel 93. The motor assembly 90 further includes a pinch roller 95 that comes in contact with feed wheel 93. A tension spring 97 is provided to bias the pinch roller 95 towards the feed wheel 93. The weld wire 86 is inserted between the feed wheel 93 and the pinch roller 95. Hence, the pinch roller 95 pushes on wire 86 to bring the wire 86 in contact with the feed wheel 93. As a result a rotation of the feed wheel 93 and the pinch roller 95 as illustrated by the arrows in FIG. 22B would be translated, in theory, into a linear movement of the wire 86, as shown by the arrow. In an embodiment, teeth are provided on the feed wheel 93 so as to grasp the wire 86 through friction and force the wire 86 to move. However, situations may occur where the wire 86 is not fully gripped by the feed wheel 93. In this case, the wire 86 may slip because although the feed wheel 93 rotates, this rotation of feed wheel 93 does not translate into precise linear movement of the wire 86. For example, this may occur when, the teeth on the feed wheel 93 are worn (thus not providing sufficient friction to grasp the wire 86), or when the pinch roller 95 is worn (thus not exerting enough pressure or force on the wire 86 to the push the wire 86 against the feed wheel 93), or when the tension spring 97 loses its preload (thus leading to the pinch roller 95 not exerting enough pressure or force on the wire 86), or when the nut 99 holding the feed wheel 93 becomes loose (thus leading to feed wheel not grasping the wire 86), or any combination thereof. As shown in FIG. 22A, the motor assembly 90 includes rotation speed sensor 92 that is configured and arranged to measure the rotation speed of the motor 91. An output 98 is provided for inputting and outputting data into and from the motor assembly 90, the data including the speed of the motor 91. The data from output 98 is sent to computer 16 associated with welding station 10.

Figure 23:
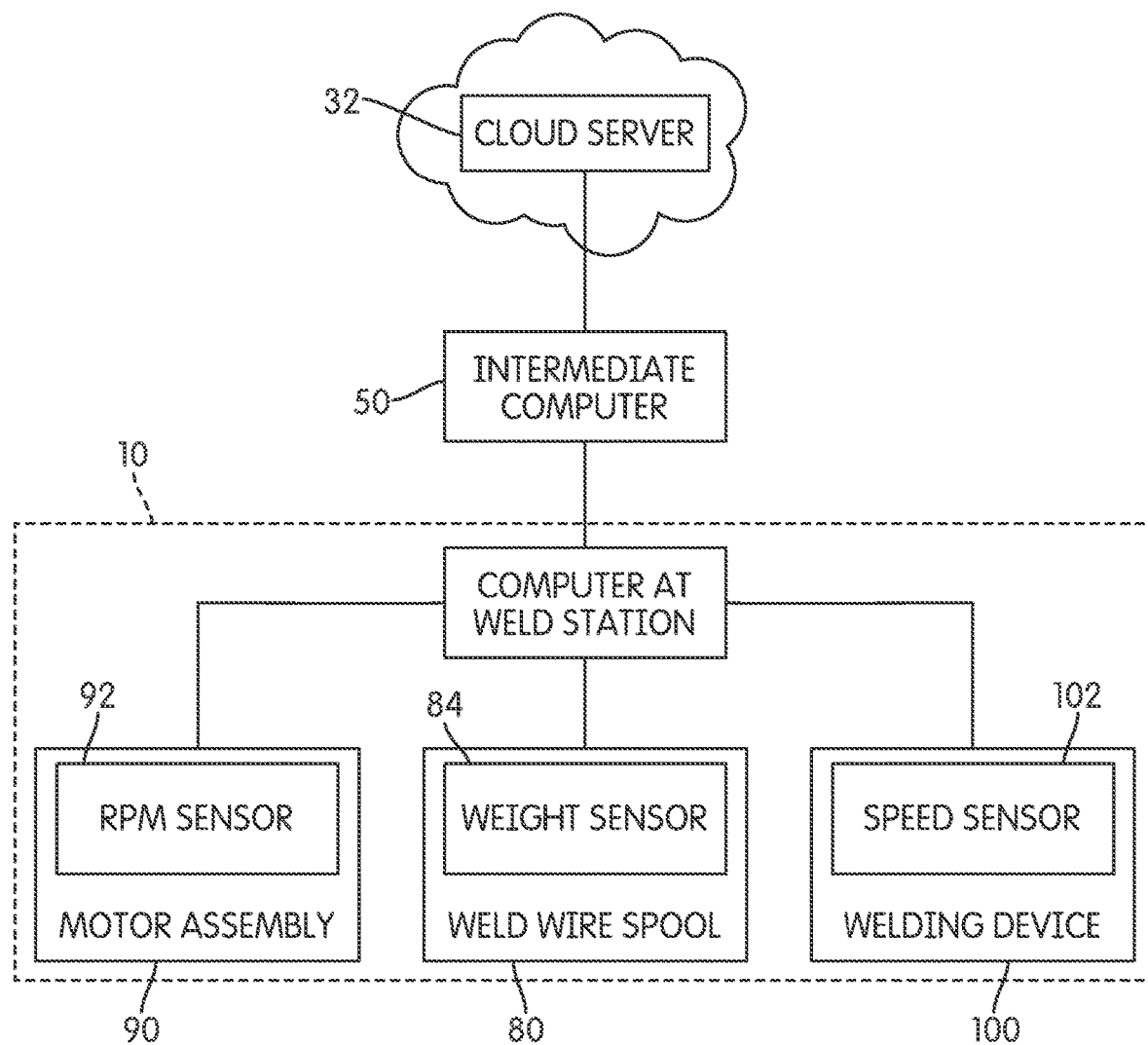
FIG. 23 is a diagram of a configuration of the welding system depicting the interconnections of various components of the system, according to an embodiment of the present disclosure.

FIG. 23 is a diagram of a configuration of the welding system depicting the interconnections of various components of the system, according to an embodiment of the present disclosure. As shown in FIG. 23, a rotation speed of the motor assembly 90 is measured by rotation speed sensor (RPM sensor) 92. In addition, the weight of the weld wire spool 80 is measured by the weight sensor(s) 84 in the hub-transducer 82. The speed of the welding device 100 is measured by the speed sensor 102. All parameters or data measured by the rotation speed sensor 92, the weight sensor 83 and the speed sensor 102 are input into computer 16 at wed station 10. In an embodiment, the computer 16 can be managed by intermediated computer 50. Intermediate computer 50 can be a wireless device such as a tablet, a mobile device, a smart phone, a laptop, etc. Therefore, the intermediate computer 50 can have access to the data at the computer 16 including the data from RPM sensor 92, weight sensor 84 and speed sensor 102. The intermediate computer 50 is further in communication (e.g., wirelessly) with the cloud server 32 where the data from the computer 16 can be stored and/or further processed. In an embodiment of the present disclosure, the intermediate computer is not used. In which case the computer 16 is connected directly (e.g., wirelessly) to the cloud server 32.

As stated in the above paragraphs, due to potential slippage, the measurement of the speed of the motor assembly (e.g., speed of the feed wheel 93) alone, in some embodiments, may not be sufficient to provide an accurate amount of weld wire that is used or consumed by the weld machine or system. Indeed, even if a rotation of the feed wheel 93 is measured accurately, the rotation of the wheel would be translated in theory into a movement and therefore into a certain length. However, due to slippage, the wire does not move and hence the length determined based on the rotation of or rotation speed of the wheel does not correspond to a real wire length. As a result, a weight of the spool of weld wire may also be measured. In an embodiment, the weight of a new and unused wire spool is about 15 kgs (15000 grams). In an embodiment, the weight of the wire spool is measured with a precision of about 100 grams over 15000 grams, that is with a precision of approximately 0.7%. Therefore, the weight provides a relatively good measurement method to determine the amount of weld wire remaining in the spool. In an embodiment, the weight of the spool is captured or measured periodically and is logged with a time stamp and communicated to the uLog every time the spool rotation stops. An indicator such as a buzzer or light flashing or the like can indicate to the welder that it is time to reload another spool. In addition, the weld machine may not commence a weld operation in this situation, in one embodiment. The indicator can indicate a weight threshold at which a complete weld cannot be completed.

In an embodiment, RF modules are further provided to read a spool serial number, manufactured weight of the spool, spool type, project name, and any detail that is fed on the RF tag mounted on the spool. This data can be transferred on the cloud via the uLog with any additional detail needed. If an old spool is reused, the system will compare the serial number against a database of already used spools and extract the last available weight from the cloud, compare the same against the new weight reading, prior to the start of work. A buzzer or indicator light is available on the system to indicate to the operator, that the details on the RF Tag have been read and communicated via CAN. The use of RF system will eliminate any manual book keeping work needed to keep track of the number of spools used, their serial numbers and further identify the work stations they are used at. In case weld wires with wrong compositions/diameters are shipped out, the system can identify this from the RF tag properties, alarming the operator of this deviation. This can go fairly unnoticed if the system was entirely manual.

In an embodiment, a difference DW between a weight W1 measured at time T1 and a weight W2 measured at a later time T2 can be calculated. The difference in weight DW (where DW=W1−W2) corresponds to the weight of wire that is consumed during a welding process. This weight difference DW can be compared to a theoretical weight TW. The theoretical weight TW can be obtained using the rotation speed R of the motor or a linear speed of the wire S (the linear speed S depends from the rotation speed R). The theoretical weight TW can be calculated using the following equation (1).

$$TW = (T2-T1) \times S \times (\text{Diameter of wire})^2 \times (\text{Density of wire material}) \times \pi/4 \quad (1)$$

If, hypothetically, there is no slippage, then the theoretical weight TW should be equal to the measured weight DW. If, on the other hand slippage occurred during a process between time T1 and time T2, then the theoretical weight TW would be greater than the measured weight DW, In this case, a ratio R between theoretical weight TW and measured weight DW is greater than 1 (R=TW/DW>1) and/or the difference Δ between the theoretical weight TW and the measured weight DW is greater than zero (Δ=TW−DW>0). As a result, if after a certain period of time or number of measurements, it is noted that the difference between the measured weight and the theoretical/calculated weight persists, the speed of the motor assembly 90 can be adjusted or compensated in order to have a calculated/theoretical weight substantially equal the measured weight. Hence, the measured weight is compared to the theoretical weight (determined from the wire feed speed) to determine if the wire is fed at the intended feed speed. In one embodiment, this determination can be accomplished locally at the welder side or by using the uLog system at the cloud server 32.

Figure 21:
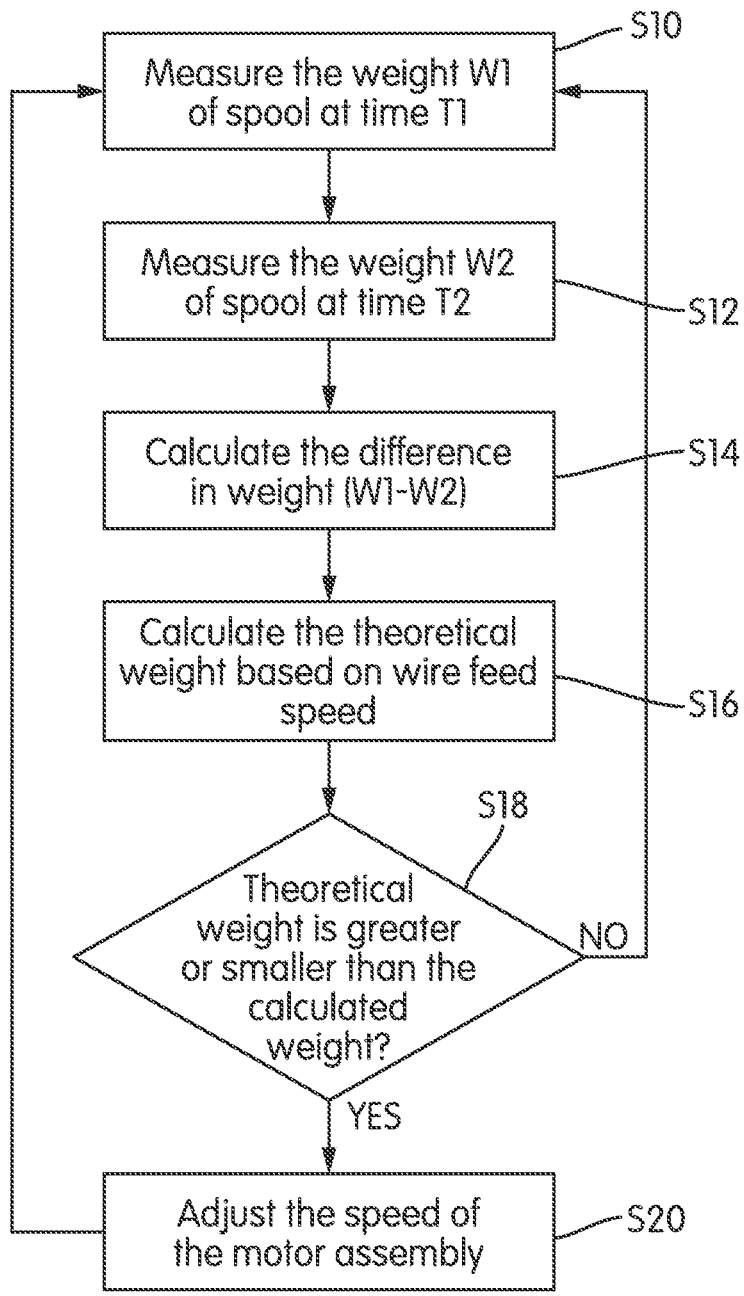
FIG. 21 is a flow chart depicting a process of comparing the measured weight and the theoretical weight determined based on the wire feed speed, according to an embodiment of the present disclosure.

FIG. 21 is a flow chart depicting a process of comparing the measured weight and the theoretical weight determined based on the wire feed speed, according to an embodiment of the present disclosure. As it can be appreciated from the above paragraphs, the process start by measuring a first weight W1 of the wire spool at a first time (T1), at S10. The process further includes measuring a second weight W2 of the spool at a second time T2, after a certain time has elapsed from time T1, at S12 (T2>T1). The process also includes calculating a difference between the first measured weight W1 and the second measured weight at time T2, at S14. The process includes calculating a theoretical weight based on wire feed speed, at S16. At S18, the theoretical weight based on the wire feed speed is compared to the calculated weight difference, and if the theoretical weight is greater or smaller than the calculated weight difference, at S18, a speed of the motor assembly pulling the wire is adjusted, at S20. The process is repeated after another increment in time, after the speed of the motor assembly is adjusted. If the theoretical weight is the same as the calculated weight difference, then the process is also repeated after another increment in time without adjusting the speed of the motor assembly. This process is repeated at a plurality of time increments in order to monitor and/or correct any potential slippage of the motor assembly 90.

This process can be implemented locally by the uLog system at the computer 16 associated with the weld station 10 or implemented by the uLog system at the cloud server 32, or implemented by the uLog system at the intermediate computer 50 described in the above paragraphs.

In an embodiment, it may be desirable to monitor usage of wire at different welding stations 10 to evaluate the overall efficiency of the welding system. For example, this will allow a predictive indication of the amount of spool needed on large projects based on previous learning. For example, usage of spools can be uploaded to the uLog system stored and processed by the cloud server 32. For example, each of the welding stations 10 can upload usage data of spools to the uLog system to the cloud server using the previously described network configurations, and based on a historical usage of a quantity of wire spools and using a machine learning algorithm (MLA), the uLog system can predict an average future usage of wire spools (or quantity of weld wire). For example, based on usage patterns over certain weld parameters, the uLog system can determine a threshold at which a complete weld cannot be completed. As a result, the uLog system can alert the welder using an indicator (e.g., a buzzer, flashing light, etc.) that the wire in the spool is depleted and that a complete weld cannot be finished based on a theoretical threshold determined using the machine learning algorithm. For example, the cloud server 32 running the uLog can be configured to provide a feedback to one or more of the plurality of the weld station computer 16 to alert a welder that a complete weld cannot be finished based on a theoretical threshold determined using the machine learning algorithm.

In a further embodiment, when there is a discrepancy between the theoretical weight determined based on the feed speed of the wire (measured by sensor 92) and the measured weight (W2−W1), where W2 and W1 are measured by weight sensors 84, instead of adjusting the speed of the motor assembly 90, a speed of the welding device 100 (or travel speed) can be adjusted to match a speed V obtained from the measured weight W2−W1.

As it can be appreciated from the above paragraphs, there is provided a welding system comprising a plurality of welding stations 10. Each weld station 10 includes a weld station computer 16 and weld system 12 in communication with the weld station computer 16. Each weld station 10 includes one or more sensors 92, 102, the one or more sensors 92, 102 being configured to measure weld data including lead wire speed data (measured by speed sensor 92), as depicted, for example in FIG. 20. The system further includes a plurality of wireless devices 50 in communication with the one or more of the weld station computers to receive the weld data including the measured lead wire speed data. The system also includes a cloud server 32 in communication with the wireless devices 50, the cloud server 32 being configured to process the weld data including the lead wire speed data, and configured to determine an amount of consumable welding material used by the plurality of welding stations 10 for a given period of time. The cloud server 32 is configured to communicate the amount of consumable weld used to one or more of the wireless devices.

In an embodiment, the weld data further includes travel speed data of the weld system. In an embodiment, the wireless devices 50 are configured to further receive the travel speed data of the weld system. In an embodiment, the cloud server 32 is further configured to process the travel speed data.

As it can be appreciated from the above paragraphs, there is also provided a welding system having a welding station, the welding station including a weld station computer and a weld system in communication with the weld station computer. The weld system includes a supply of weld material 80, a welding device 100, and a weld supply motor assembly 90 that moves the weld material 86 in the weld supply material 80 to the welder device. The welding system further includes a weighting device 82 operatively connected with the weld station computer 16 and configured to measure a weight of the supply of weld material 80 and to communicate the weight of the supply of weld material 80 to the weld station computer 16 in the form of weight data, and a sensor 92 operatively connected with the weld supply motor assembly 90 and the weld station computer 16 so as to communicate the speed of the weld supply motor assembly 90 to the weld station computer 16 in the form of speed data. The weld station computer 16 is operatively connected to the weld supply motor assembly 90 and is configured to control the speed of the motor assembly 90 based on the weight data.

As it can be further appreciated from the above paragraphs, there is provided a welding system including a plurality of welding stations 10, each welding station 10 including a weld station computer 16 and weld system 100 in communication with the weld station computer 16, each welding station 10 including one or more sensors 92, the one or more sensors 92 configured to measure weld data including lead wire speed data. The welding system also includes a plurality of wireless devices 50 in communication with the one or more of the welding station computers 16 to receive the weld data including the measured lead wire speed data. Each weld station computer 16 is configured to process the weld data, including the lead wire speed data, for the weld system 100 in communication therewith. The weld station computer 16 is further configured to determine an amount of consumable welding material used by the weld system 100 for a given period of time and generating consumption data based thereon.

In an embodiment, each welding station 10 further includes a motor 90 for moving the lead wire at the lead wire speed, wherein the lead wire speed data is determined based upon a speed of the motor 90, each welding station 10 further comprising a weight sensor 84 that senses a weight depletion of the consumable material. The weight sensor 84 provides output signals to the weld station computer 16. The weld station computer 16 utilizes the output signals to determine the consumption data. In an embodiment, the weld station computer 16 utilizes the consumption data to control the speed of the motor 90. In an embodiment, the system further includes a cloud server 32 for receiving the consumption data, together with the lead wire speed data, to correlate the consumption data with the lead wire speed data.

This disclosure is to be broadly construed. It is intended that this disclosure disclose equivalents, means, systems and methods to achieve the devices, activities and mechanical actions disclosed herein. For each software and/or mechanical element or mechanism disclosed, it is intended that this disclosure also encompass in its disclosure and teaches equivalents, means, systems and methods for practicing the many aspects, mechanisms and devices disclosed herein. Additionally, this disclosure regards a cloud-based pipeline welding system and its many aspects, features and elements. Such a system and its related equipment can be dynamic in its use an operation, this disclosure is intended to encompass the equivalents, means, systems and methods of the use of the tool and its many aspects consistent with the description and spirit of the operations and functions disclosed herein. The claims of this application are likewise to be broadly construed.

All of the disclosure regarding the embodiments herein is to be broadly construed and can be made, used, as software and hardware products implemented and executed by electronic means, computer means, as computer readable program code means (use herein synonymously with "program executable code", "computer code", "software code", or "code"), software, by electronic processing and electronic calculations. The methods disclosed herein are related welding in all of its aspect as well as pipeline construction and other construction activities and can be implemented for use and execution in an electronic computing environment and/or cloud or cloud-based environment, such as by use of processing unit, central processing unit, computer, distributed processing and/or computing system, wireless device, laptop, handheld device, cloud-based processing and any electronic architecture adapted to process the calculations and method disclosed herein.

All of the embodiments herein can be made, used, implemented and executed by computer readable program code means. There is no limitation as to the type and nature of computer readable program code means which can be used to achieve the methods and calculations disclosed herein. The software products are not limited and can broadly be any software and or application product capable of processing the numerical methods and calculations disclosed herein. The software products can be applications, subroutines, mobile applications, smartphone applications, wireless applications, cloud-based applications, cloud-based services, or any by computer readable program code means adapted to achieve the methods disclosed herein. There is no limitation on the nature of the product whether the application is source code, compiled code, non-compiled code, downloaded code, compressed code, executable code. This disclosure expressly encompasses any product which provides the method herein to a use and which can provide to, implement, execute, support or enable a user to practice, make or use any method disclosed herein in any embodiment or part thereof.

All of the embodiments herein are transformative in nature. The disclosed numerical methods are to be executed by a computer to transform data regarding at least one item with at least one property value and an at least one uncertainty value by electronic and/or computer means to achieve an output which can be perceived and utilized by a user of the methods disclosed herein.

This scope disclosure is to be broadly construed. It is intended that this disclosure disclose equivalents, means, systems and methods to achieve the computations, software, functions, devices, activities, electronics, computers, systems and mechanical actions disclosed herein. For each functionality, software, method, computation, or executable program code disclosed, it is intended that this disclosure also encompass in its disclosure and teaches equivalents, means, systems and methods for practicing the many aspects of the methods, means, apparatus and articles disclosed herein. Additionally, this disclosure regards welding and pipeline construction equipment and support, software and products related thereto and its many aspects, features and elements. Such a technology can be dynamic in its use an operation, this disclosure is intended to encompass the equivalents, means, systems and methods of the use of the disclosed technology and its many aspects consistent with the description and spirit of the operations and functions disclosed herein. The claims of this application are likewise to be broadly construed.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

Furthermore, since numerous modifications and changes will readily occur to those of skill in the art, it is not desired to limit the invention to the exact construction and operation described herein. Accordingly, all suitable modifications and equivalents should be considered as falling within the spirit and scope of the invention.

What is claimed:
1. A welding system, comprising:
a plurality of welding stations, each welding station including a weld station computer and weld system in communication with the weld station computer, each welding station including one or more sensors, the one or more sensors configured to measure weld data, wherein the weld data includes data related to one or more operating parameters of the weld system that are configured to control an ongoing weld operation of the weld system;

a plurality of wireless devices in communication with the one or more of the welding station computers to receive the weld data; and a cloud server in communication with the wireless devices, the cloud server being configured to process the weld data, wherein the cloud server is configured to communicate the processed weld data to one or more of the wireless devices, wherein, if the weld data is outside a threshold, the weld station computer is configured to instruct the weld system to modify the ongoing weld operation of the weld system.

2. The welding system according to claim 1, wherein the weld data comprises voltage data, current data, speed data, or any proper combination thereof.

3. The welding system according to claim 2, wherein the voltage data includes a lead voltage applied to a weld wire.

4. The welding system according to claim 2, the current data includes a lead current applied to a weld wire.

5. The welding system according to claim 2, wherein, if the current data in the weld system is high, the weld station computer instructs the weld system to slow down a speed of the weld system or controls a position of a torch in the weld system.

6. The welding system according to claim 2, wherein the speed data includes a lead wire speed of a weld wire.

7. The welding system of claim 1, wherein the cloud server is configured to process the weld data in real-time.

8. The welding system according to claim 1, wherein the welding system is configured to provide real-time quality control of the weld operation of the weld system based on the weld data.

9. The welding system according to claim 1, wherein the welding system is configured to provide real-time monitoring the weld operation of the weld system.

10. The welding system according to claim 1, wherein the welding system is configured to process the weld data from one or more of the plurality of welding stations simultaneously.

* * * * *